United States Patent [19]
Fukushima et al.

[11] Patent Number: 4,665,556
[45] Date of Patent: May 12, 1987

[54] IMAGE SIGNAL PROCESSOR

[75] Inventors: Tadashi Fukushima, Hitachi; Yoshiki Kobayashi, Higashi; Yoshiyuki Okuyama; Takeshi Katoh, both of Hitachi; Seiji Kashioka, Hachioji, all of Japan

[73] Assignee: Hitachi, Ltd., Tokyo, Japan

[21] Appl. No.: 578,508

[22] Filed: Feb. 9, 1984

[30] Foreign Application Priority Data

Feb. 9, 1983 [JP] Japan ................................. 58-21321

[51] Int. Cl.$^4$ .............................................. G06K 9/00
[52] U.S. Cl. ...................................... 382/41; 382/49; 364/133
[58] Field of Search ............................ 382/41, 49, 69; 364/133

[56] References Cited

U.S. PATENT DOCUMENTS

| | | | |
|---|---|---|---|
| 4,215,901 | 7/1980 | Holsztynski et al. | 382/49 |
| 4,224,600 | 9/1980 | Sellner | 382/41 |
| 4,275,380 | 6/1981 | Gardner et al. | 382/69 |
| 4,300,122 | 11/1981 | McMahon | 382/8 |

OTHER PUBLICATIONS

Boxer and Batchelor, "Microprocessor Arrays for Pattern Recognition", May 1978.
Preston et al., "Basics of Cellular Logic . . . ", *Proc. of the IEEE*, vol. 67, No. 5, May 1979, pp. 826-834.
Batcher, "MPP: A Supersystem for Satellite Image Processing", *AFIPS Conference Proceedings*, National Computer Conference, Jun. 1982, pp. 187-191.
Orbach, "Real-Time Video Image Enhancement Using Hardware Convolver", *Proceedings IEEE Computer Society:* PRIP '82, Jun. 1982, Las Vegas, pp. 390-392.

*Primary Examiner*—Leo H. Boudreau
*Attorney, Agent, or Firm*—Antonelli, Terry & Wands

[57] ABSTRACT

A high speed, multi-function and expandable image processing LSI (image signal processor) for realizing a gray level image processing technique is disclosed. The architecture of the image signal processor can process a gray level image having 256 tones at a video rate (256×256 image, 6 MHz, non-interlace), allows expansion of a partial operation area (kernel) and can carry out various partial neighborhood operations. The image signal processor is a partial parallel type image processing LSI which carries out a parallel operation by using the same number of processor elements as that of input pixel data used to produce one output pixel of data.

15 Claims, 40 Drawing Figures

IMAGE DATA TRANSFER

PROCESSING OPERAND SUPPLY

LINKAGE AMONG THE LSIS

IMAGE PROCESSING SYSTEM WITH 4 ISPs

ISP-BLOCK DIAGRAM

IMAGE DATA INPUT WITH TWO BUSES

IMAGE DATA INPUT WITH TWO BUSES

IMAGE DATA INPUT WITH FOUR BUSES

FIG. 9 CONTROL ARCHITECTURE FOR IMAGE AND OPERAND DATA

OPERATION CIRCUIT STRUCTURE
OF PU AND LU

FIG. 11

| Left | Pin | | Pin | Right |
|---|---|---|---|---|
| $A_7$ | 1 | | 64 | $B_7$ |
| $A_6$ | 2 | | 63 | $B_6$ |
| $A_5$ | 3 | | 62 | $B_5$ |
| $A_4$ | 4 | | 61 | $B_4$ |
| $A_3$ | 5 | | 60 | $B_3$ |
| $A_2$ | 6 | | 59 | $B_2$ |
| $A_1$ | 7 | | 58 | $B_1$ |
| $A_0$ | 8 | | 57 | $B_0$ |
| $A_b$ | 9 | | 56 | $B_b$ |
| $MRA_3$ | 10 | | 55 | BD |
| $MRA_2$ | 11 | | 54 | CLK |
| $MRA_1$ | 12 | | 53 | OPS |
| $MRA_0$ | 13 | | 52 | $\overline{RES}$ |
| $SYNC_1$ | 14 | | 51 | $\overline{WE}$ |
| $SYNC_0$ | 15 | | 50 | BNR |
| $V_{SS}$ | 16 | | 49 | $LO_{15}$ |
| $LI_{15}$ | 17 | | 48 | $LO_{14}$ |
| $LI_{14}$ | 18 | | 47 | $LO_{13}$ |
| $LI_{13}$ | 19 | | 46 | $LO_{12}$ |
| $LI_{12}$ | 20 | | 45 | $LO_{11}$ |
| $LI_{11}$ | 21 | | 44 | $LO_{10}$ |
| $LI_{10}$ | 22 | | 43 | $LO_9$ |
| $LI_9$ | 23 | | 42 | $LO_8$ |
| $LI_8$ | 24 | | 41 | $V_{CC}$ |
| $LI_7$ | 25 | | 40 | $LO_7$ |
| $LI_6$ | 26 | | 39 | $LO_6$ |
| $LI_5$ | 27 | | 38 | $LO_5$ |
| $LI_4$ | 28 | | 37 | $LO_4$ |
| $LI_3$ | 29 | | 36 | $LO_3$ |
| $LI_2$ | 30 | | 35 | $LO_2$ |
| $LI_1$ | 31 | | 34 | $LO_1$ |
| $LI_0$ | 32 | | 33 | $LO_0$ |

$f(\phi_1, \phi_2)$ $f(\tau_1, \tau_2)$ $f(\phi_1, \phi_2, \tau_1, \tau_2)$

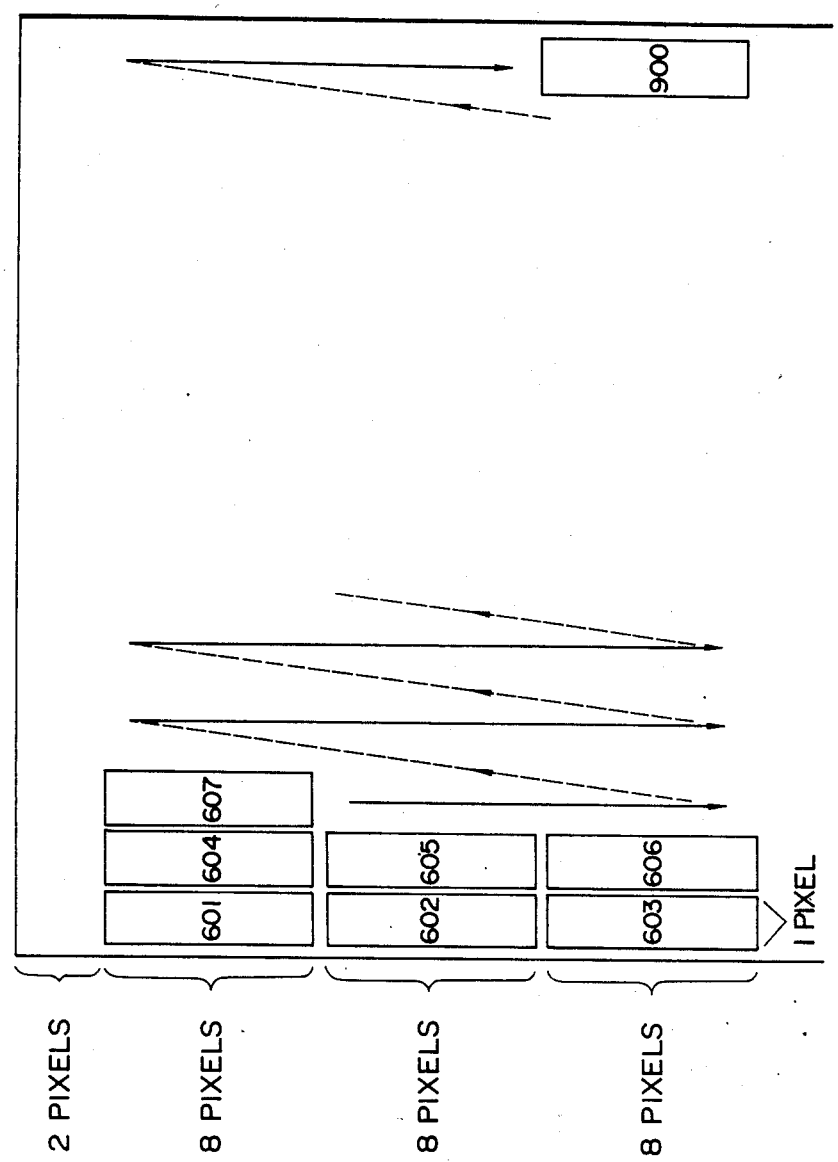

IMAGE SIGNAL PROCESSOR

Image processing and pattern recognition have been studied from many years, and in several years, they will be put into practice as a semiconductor technology and a computer architecture which are well developed. A binary image processing technique has so far been the main subject of applications, but as needs become more versatile, a gray level image processing technique having 256 levels will be required in the future. However, because of lack of an LSI device which permits high speed processing of a gray level image, it has been difficult to develop a high speed, high performance and inexpensive industrial image processing system. Thus, the development of an image signal processing (image signal processor) LSI having a high speed, multi-function and an expandability is required in order to put a gray level image processing technique into practice.

The image processing technique for processing image data can be generally classified into pre-processing, character extraction processing and decision processing. Means which are adapted to perform the pre-processing and which has general applicability and selective execution ability may be implemented in an image processor which uses a conventional computer. However high speed processing cannot be attained by a series of steps of storing image data in a memory, reading out the stored data and processing it, and storing a result in the memory. This may result from the fact of two-dimensional image data being processed by the computer which is inherently designed to perform operations for numeric data.

The image data is characterized in that it is closely related to two-dimensionally extended pixels rather than individual pixel states. However, since the storage status of the data is not spatial, the characteristic of the data that has a local two-dimensional extension is neglected if the image data is accessed for every adjacent pixel of data, and additional address calculation is needed.

In most cases, information quantity of each pixel comprises one to several bits. Nevertheless, similar processing to that for ordinary numeric data is necessary. Because of those reasons, the prior art method cannot attain a high speed operation.

One means for attaining the high speed operation is an apparatus which performs the image processing by pure hardware. However, it has been a problem to design and manufacture a general purpose device which meets requirements of versatility of subjects to be processed and complexity of processing and which assures the high speed operation.

As an approach to resolve the above problem, means is disclosed in Japanese Patent Publication No. 56-22025, which stores the image data in a shift register and stores a program to meet the requirement for the high speed operation and the general applicability. However, this technique is used in a general purpose large computer which cannot be put into practice as it is, and it must be implemented in a LSI.

The present invention discloses an architecture which permits realization in a LSI.

The objects and advantages of the present invention will be apparent from the following description when considered in conjunction with the accompanying drawings in which:

FIGS. 1 to 10 show drawings which illustrate features of the ISP of the present invention, and FIGS. 11 to 33 show embodiments of the ISP.

FIG. 1 shows a route along which image data of input data to the ISP is transferred to PE's (processor elements), with shift registers being disposed among the PE's, FIG. 2 shows a route along which operands of the input data to the ISP are transferred to the PE's, the data being temporarily stored in a RAM then it is supplied to the PE's, FIG. 3 illustrates image processing with a plurality of ISP's, FIG. 4 shows an image system having four ISP's. When a kernel is of $4 \times 4$ size, major data processing is carried out with three externally mounted delay elements and four ISP's. An output image is displayed at a left-top position.

Figure 5:
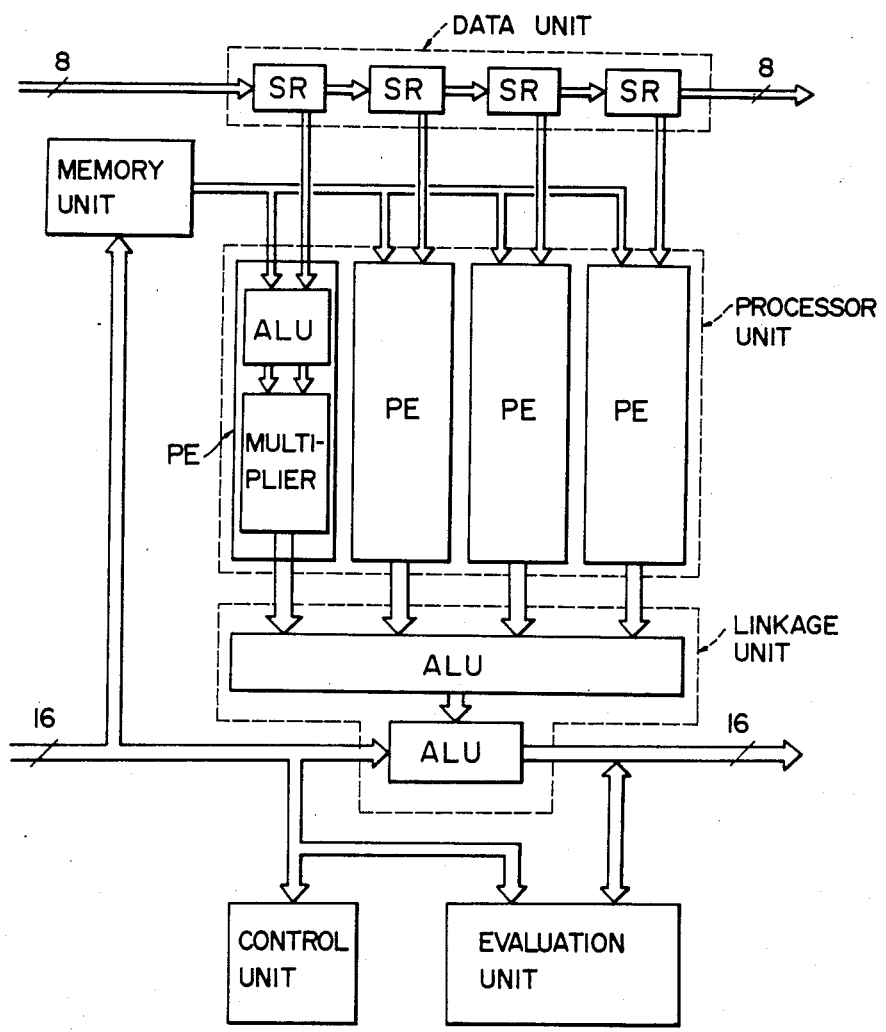
FIG. 5 shows a basic configuration of the ISP, which comprises a data unit, a memory unit, a processor unit, a linkage unit, an evaluation unit and a control unit.
Figure 6:
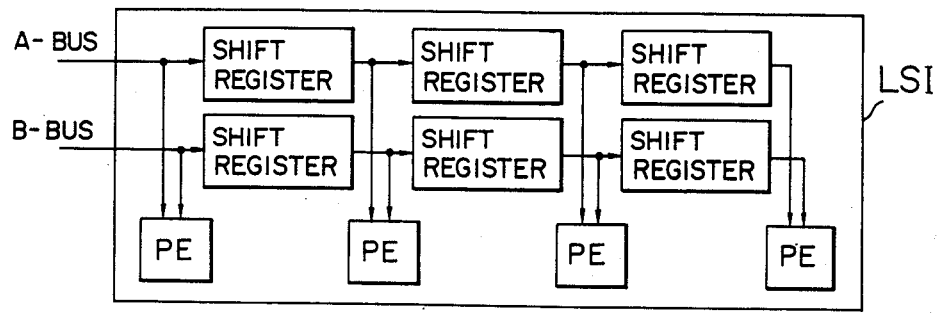
FIGS. 6, 7 and 8 illustrate image data input systems, in which data is transferred to the PE through delay elements or directly with the data being transferred through three routes using an A-bus, a B-bus and an LI-bus.
Figure 7:
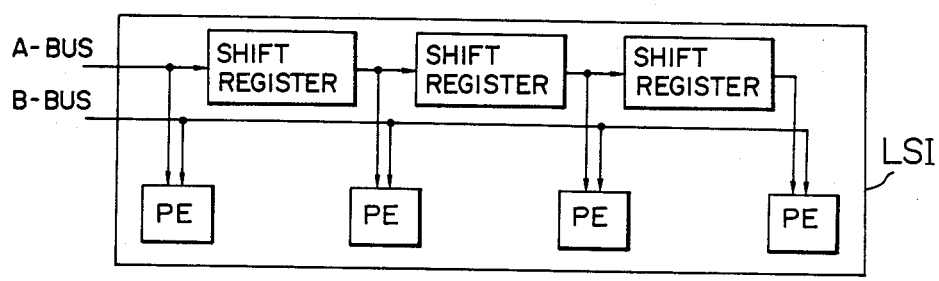
Figure 8:
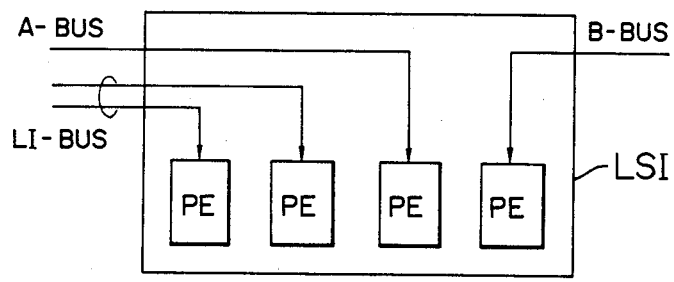
Figure 9:
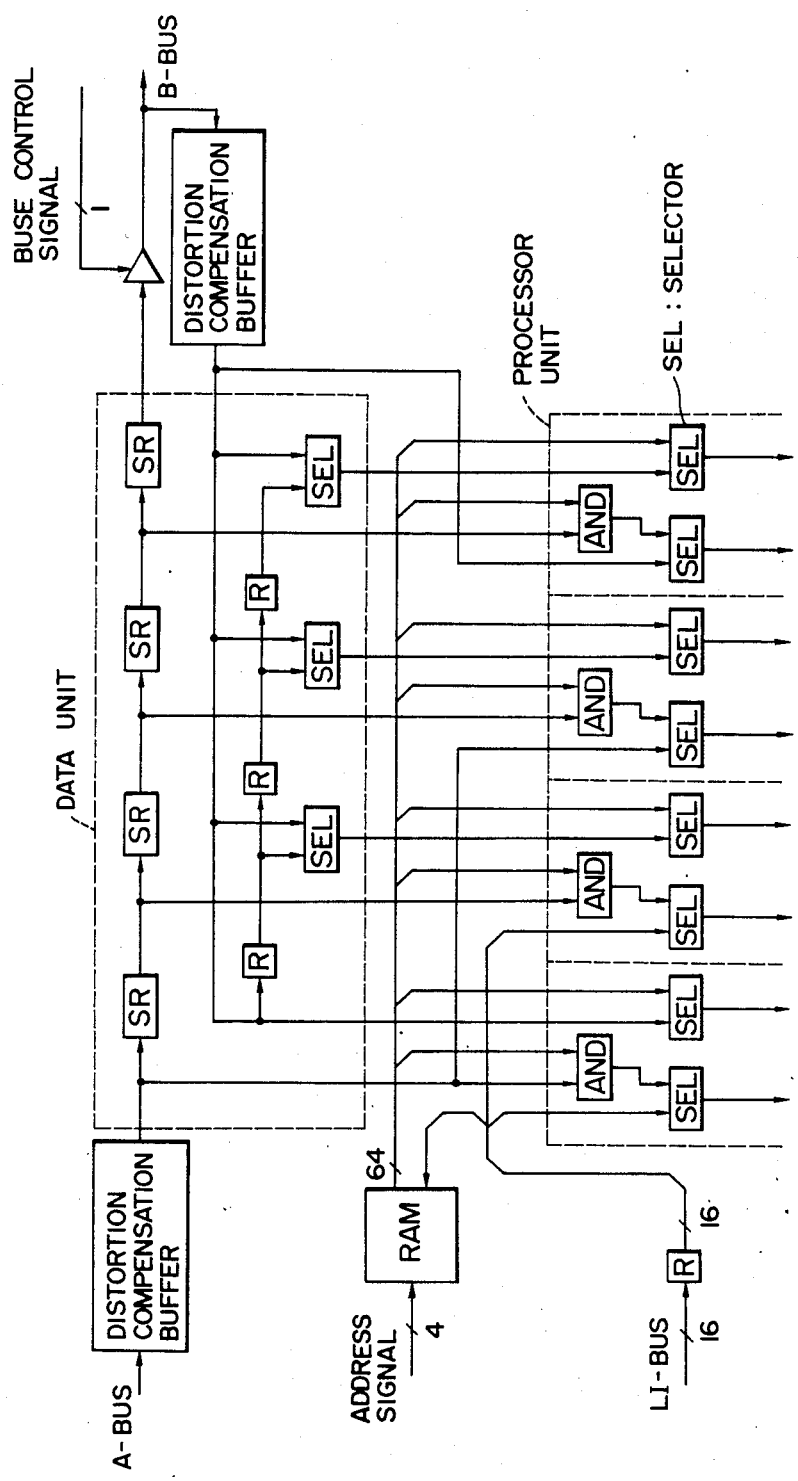
Figure 10:
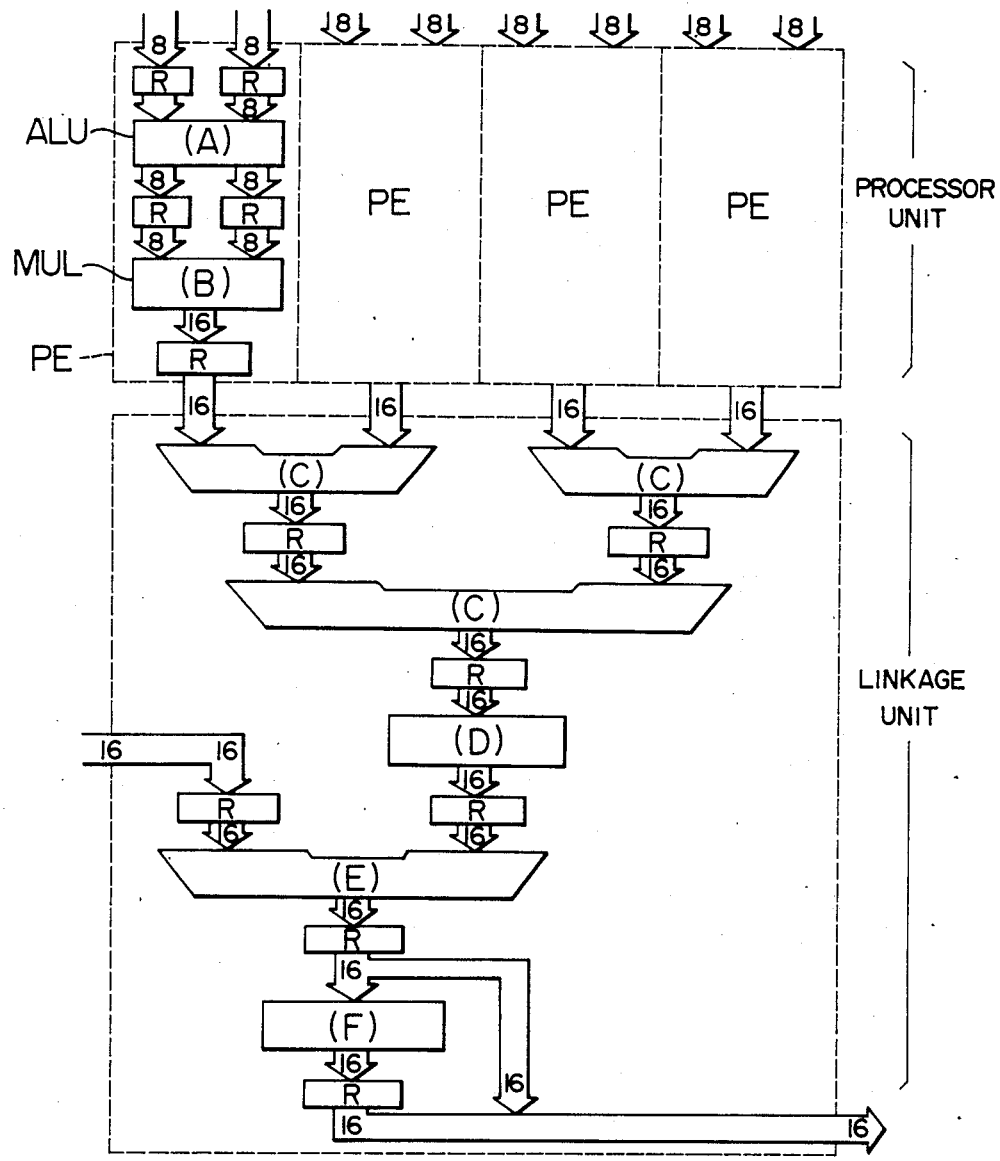
Figure 12:
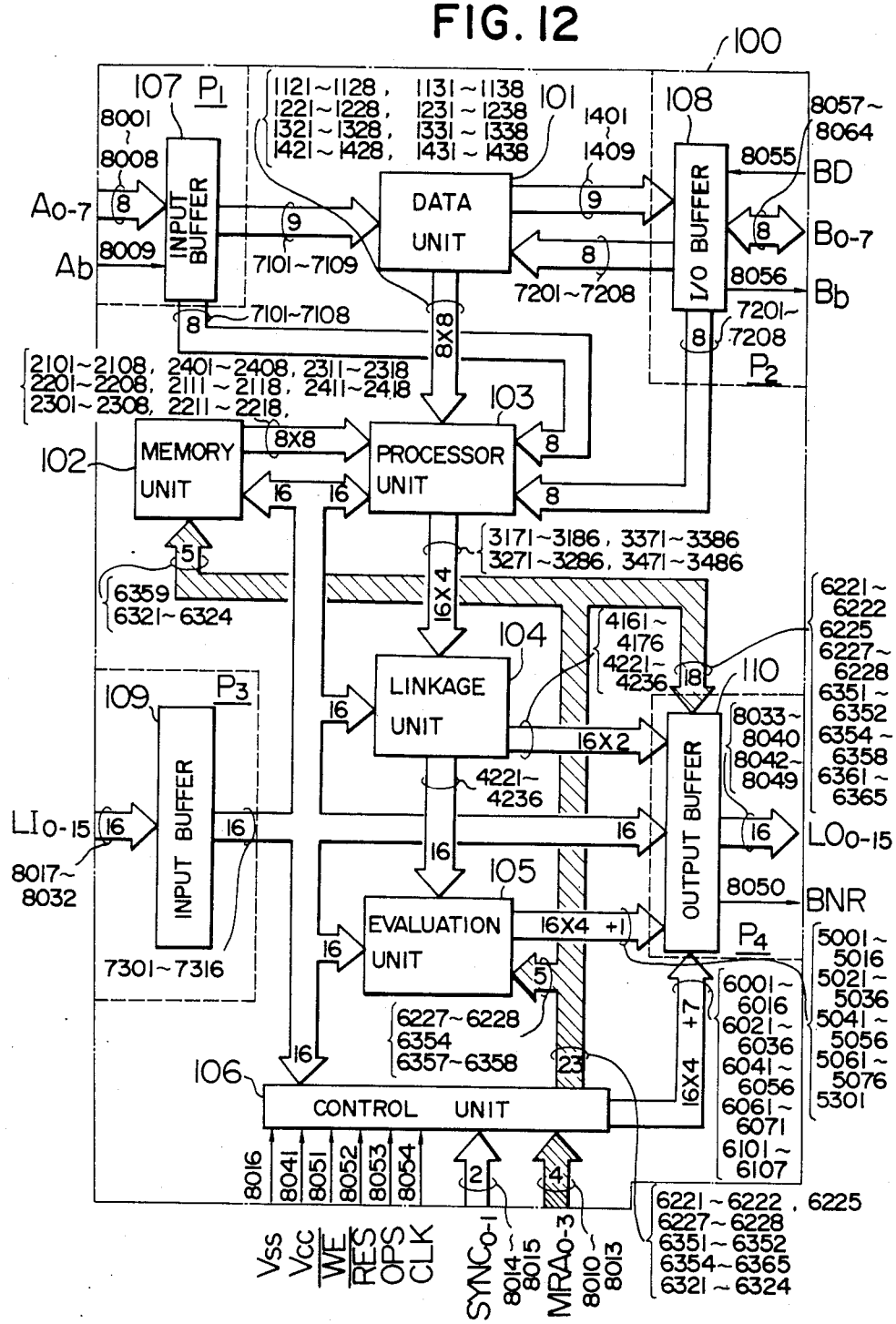

FIG. 9 illustrates that the systems of FIGS. 6, 7 and 8 are controlled by an external signal line of the ISP, FIG. 10 shows an operation circuit between the processor unit and the linkage unit, which has a pipeline stage isolated by registers, FIG. 11 shows an outer view of the ISP which is mounted in a dual in-line 64-pin package, FIG. 12 shows a detail of FIG. 5 and shows an overall configuration of the ISP, input/output buffers and respective units of which are shown in detail in FIGS. 14 to 23.

Figures 13A, 13B, 13C, 14:
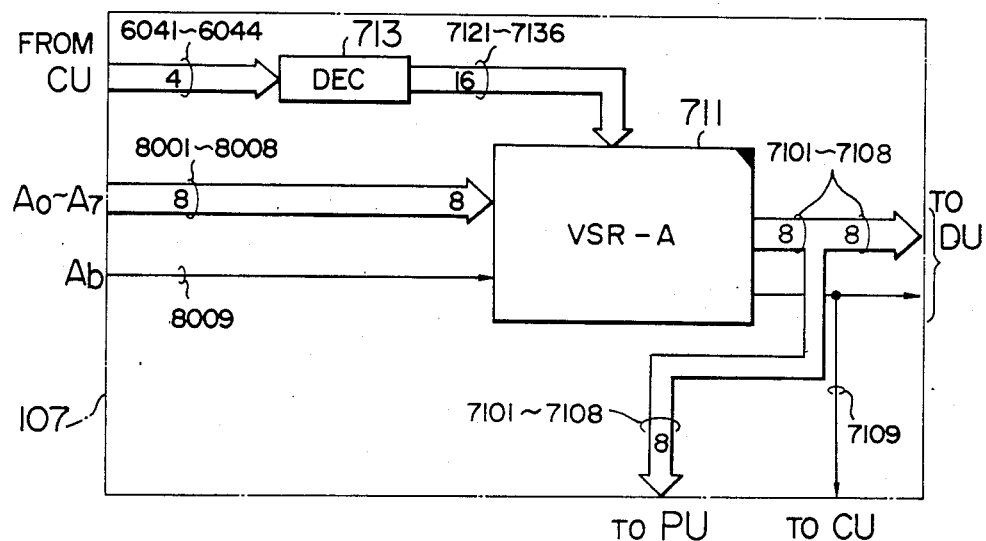
Figure 15:
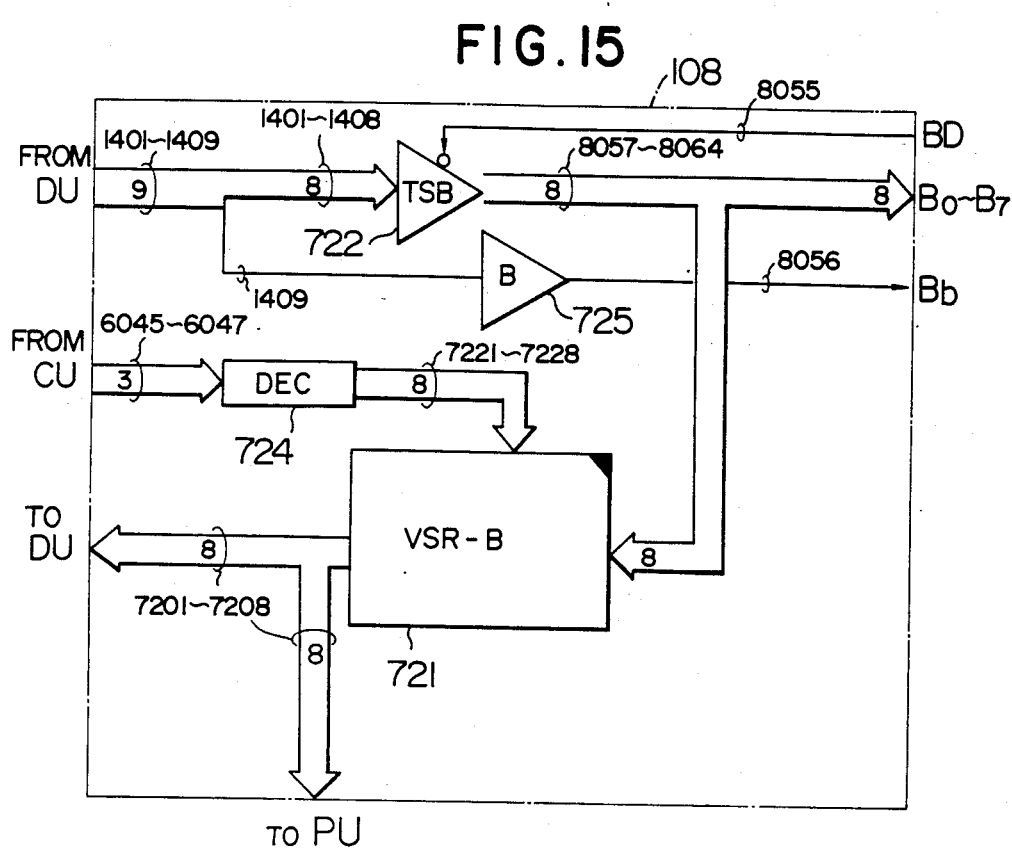
Figure 16:
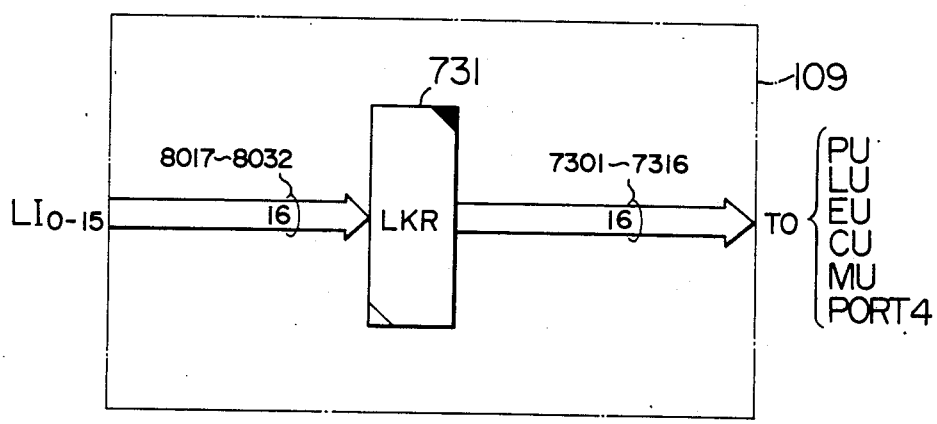
Figure 17:
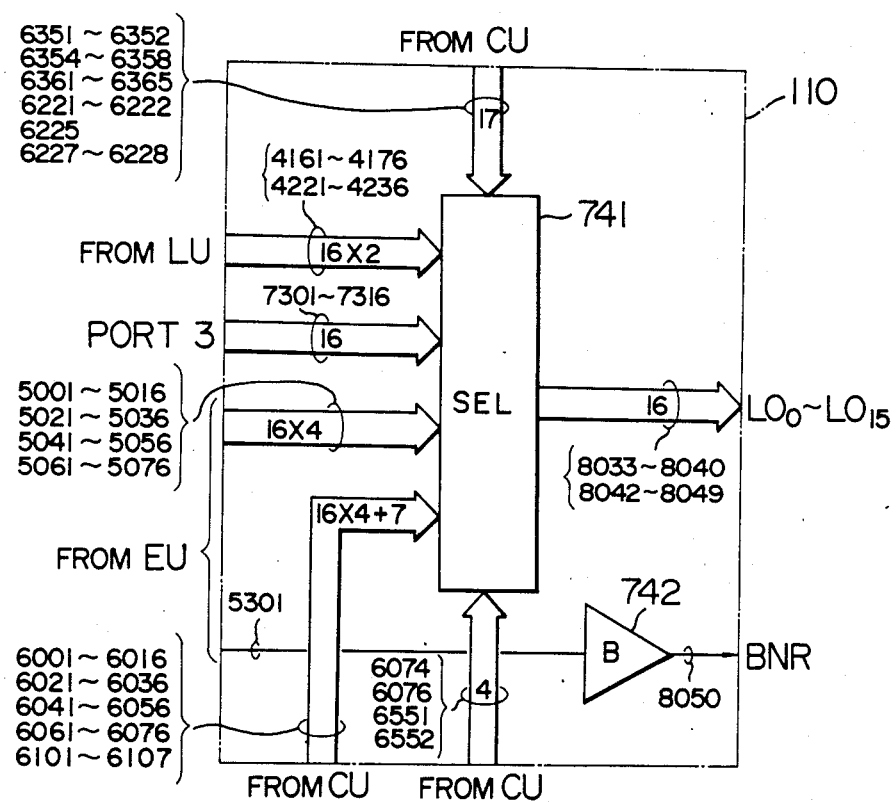
Figure 18:
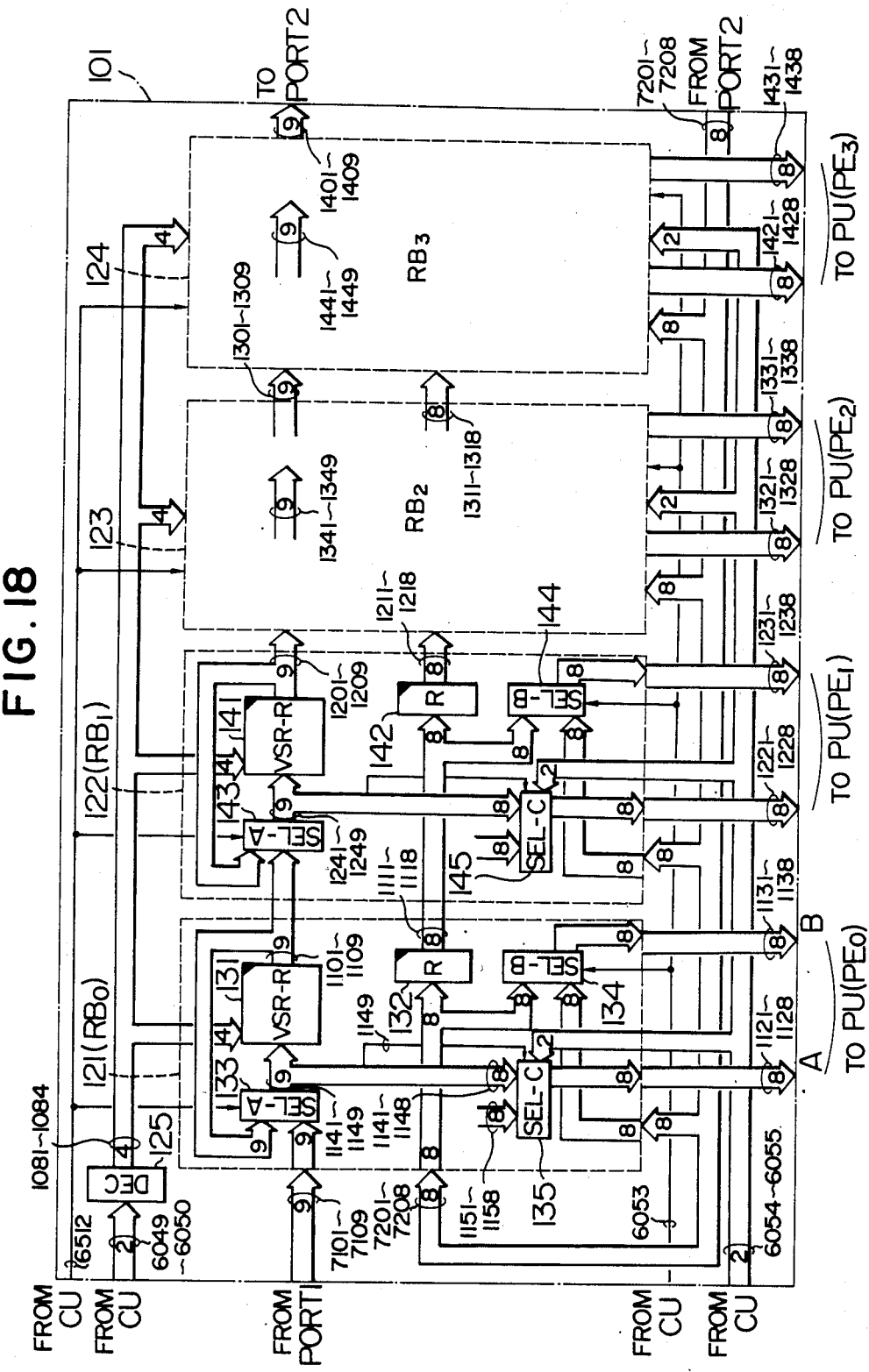
Figure 19:
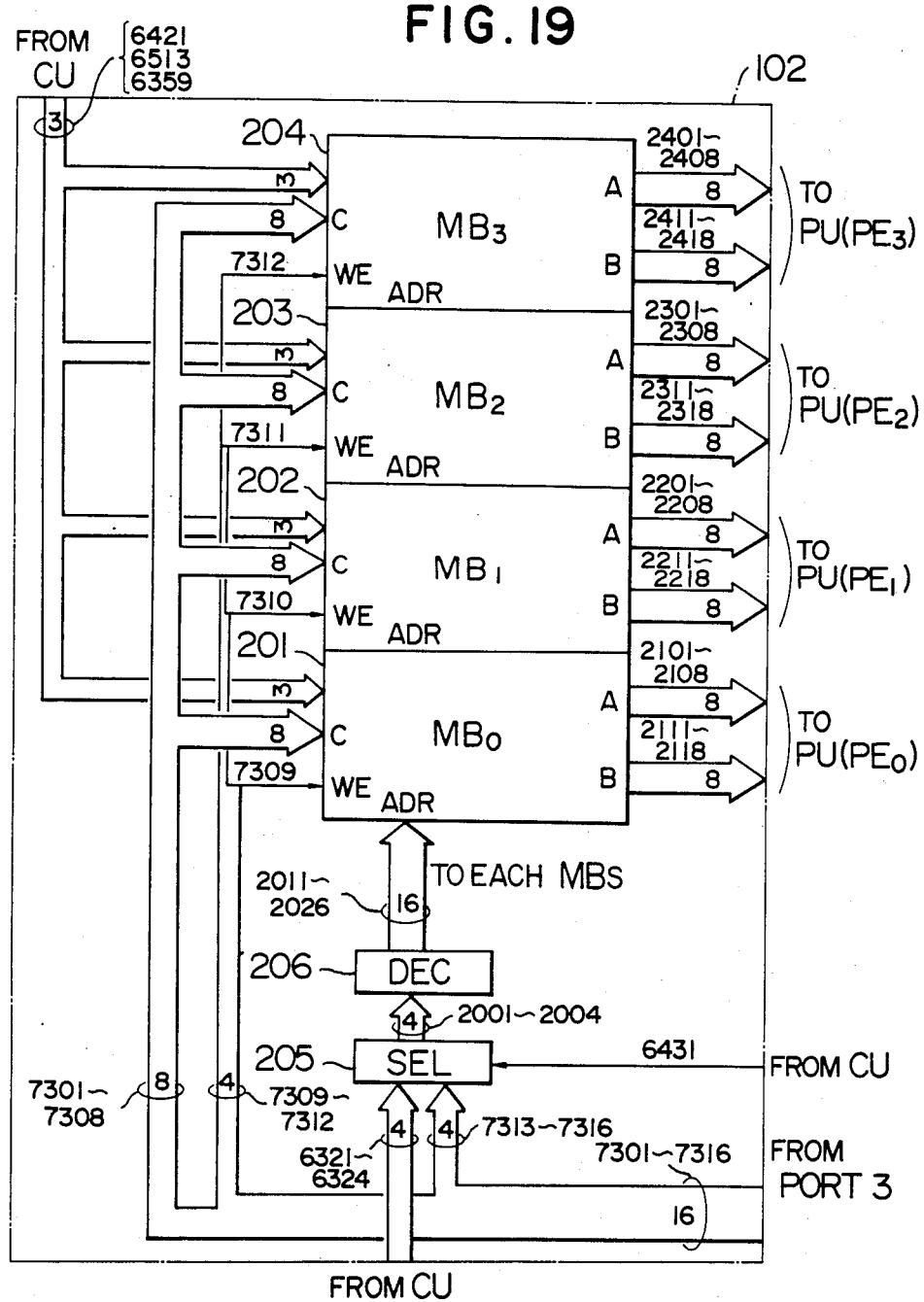
Figure 20:
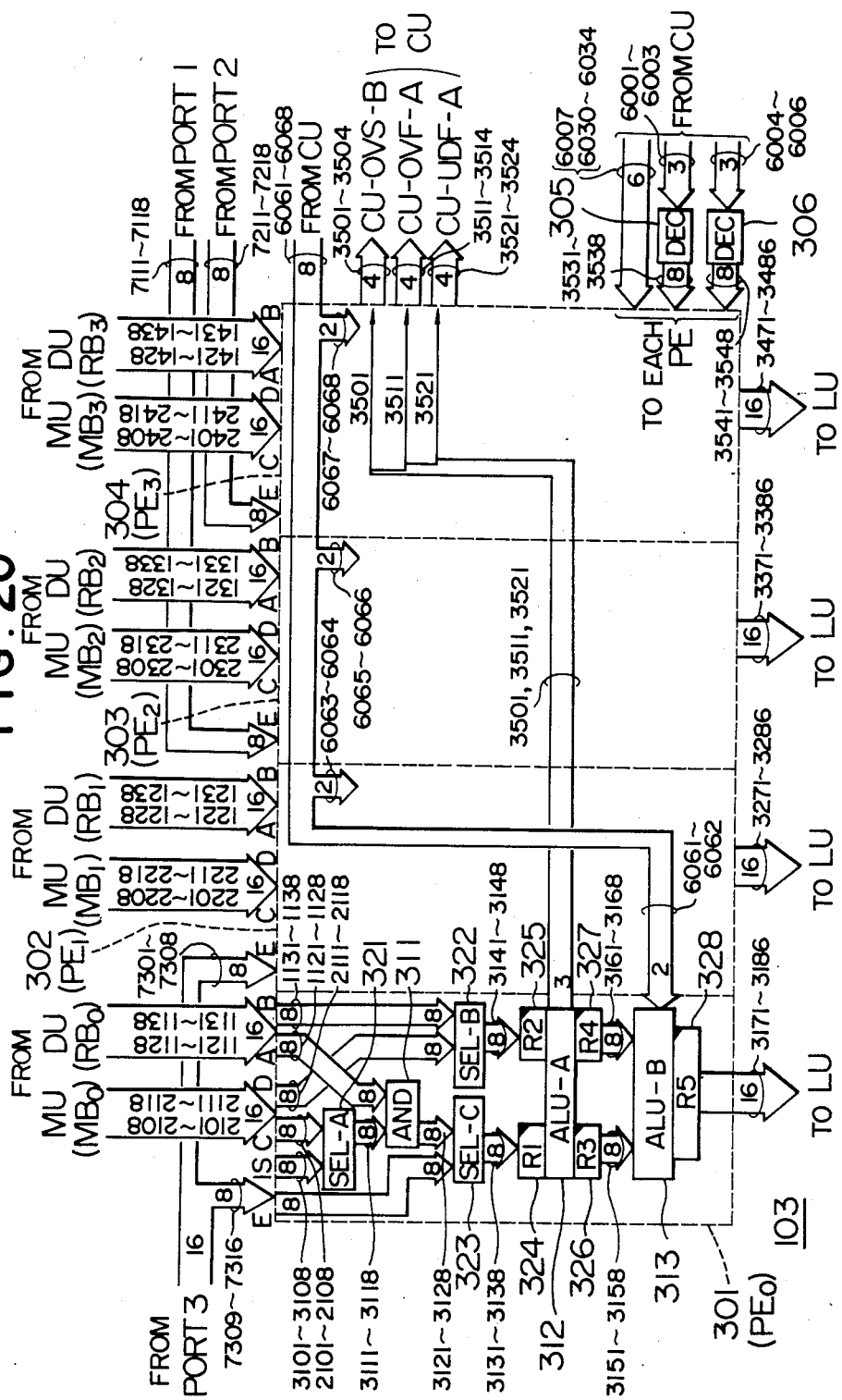
Figure 21:
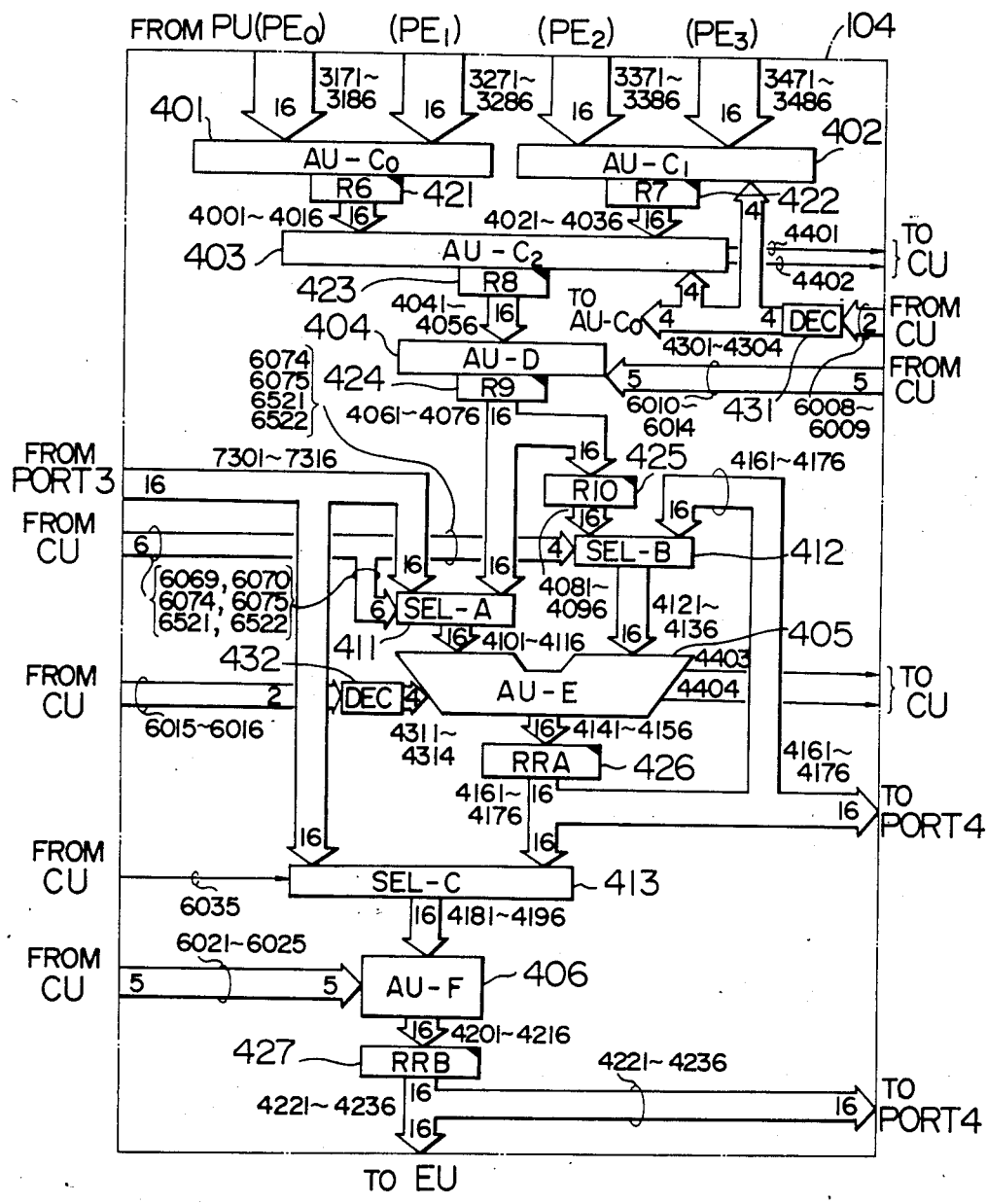
Figure 22:
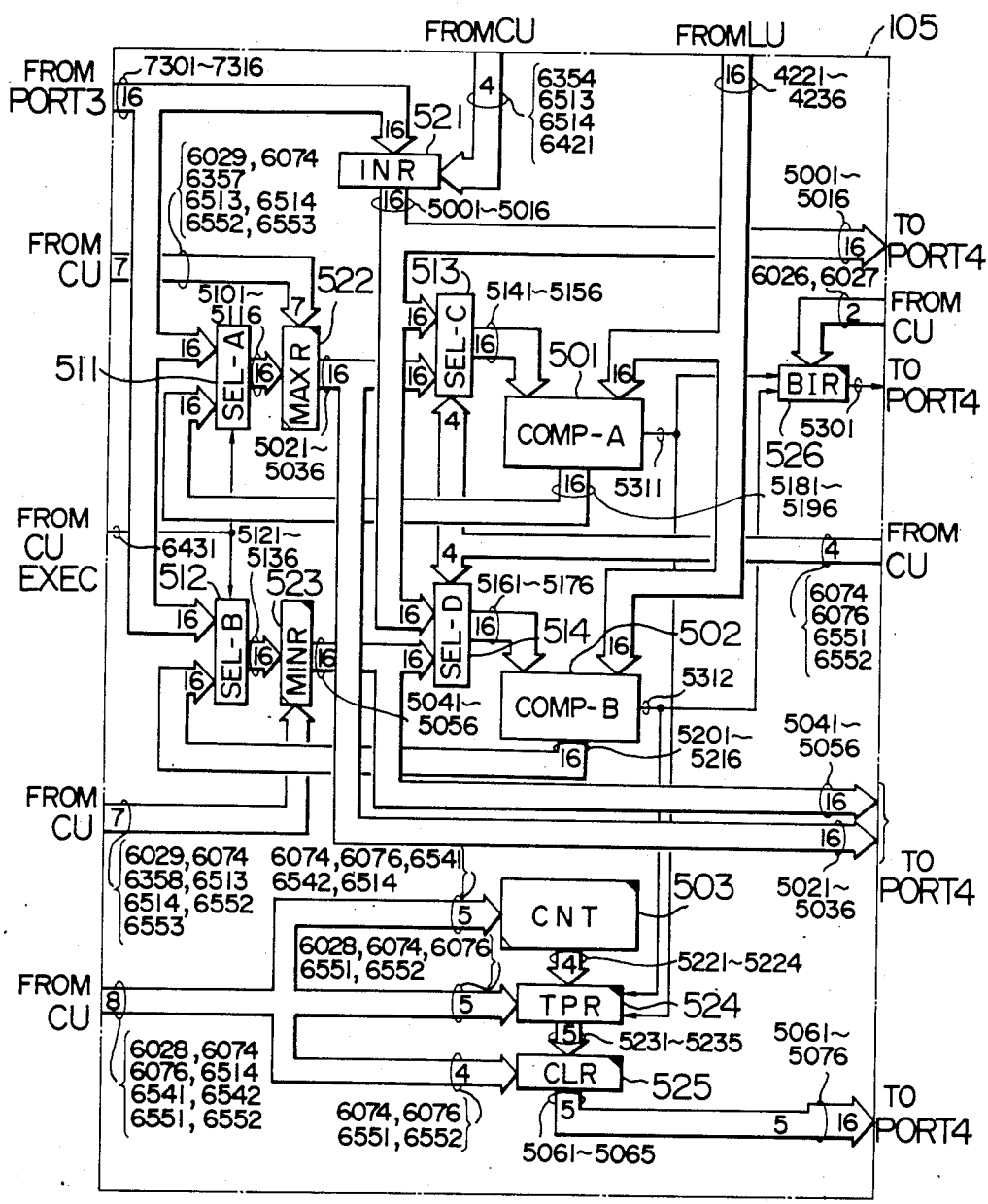
Figure 23:
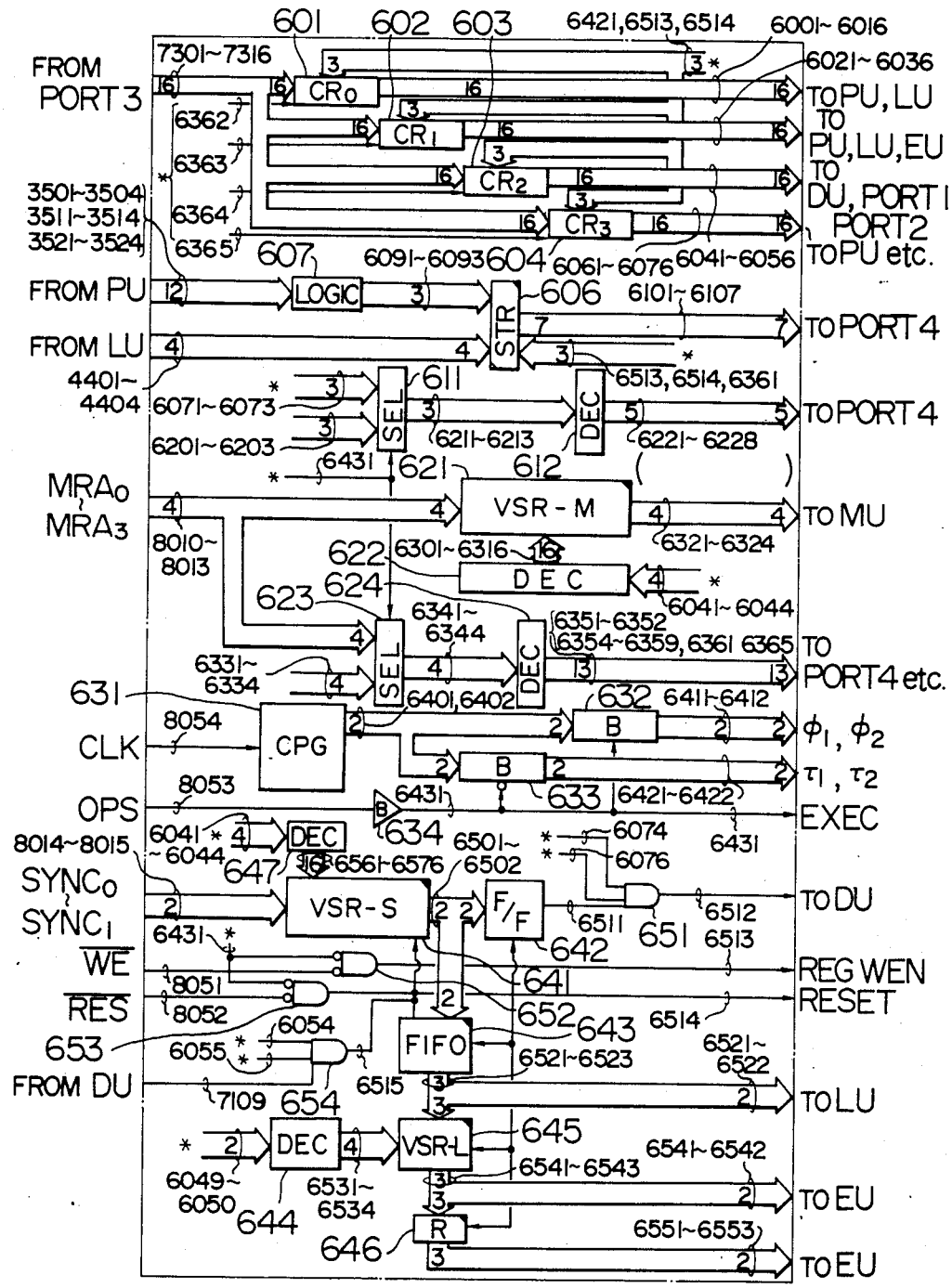
Figure 24:
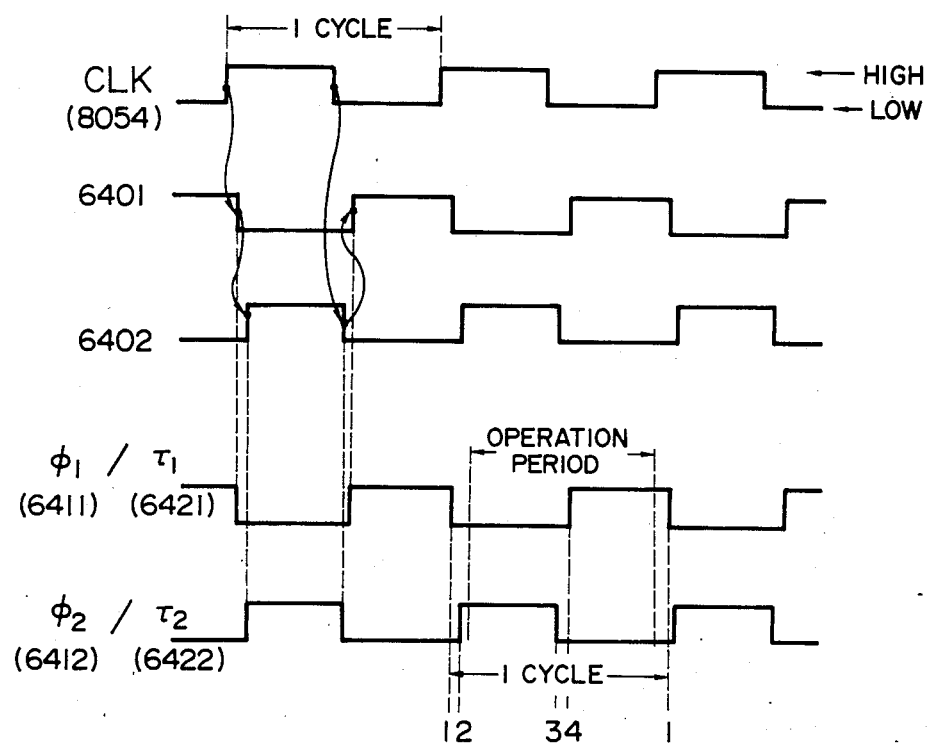
Figure 25:
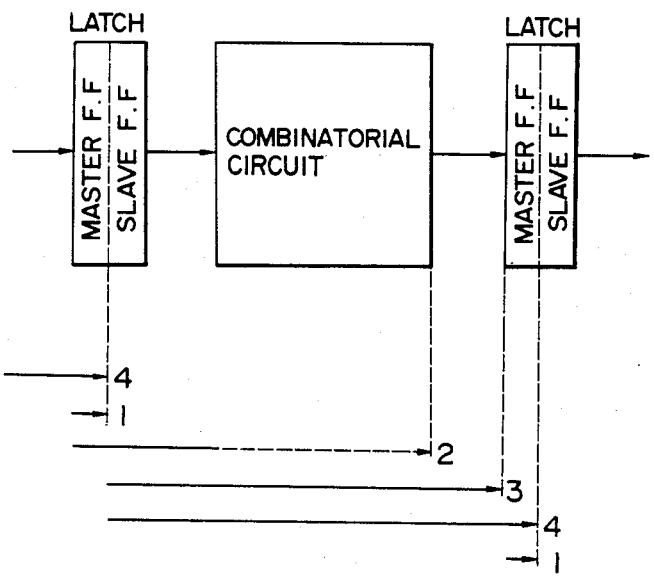
Figure 26:
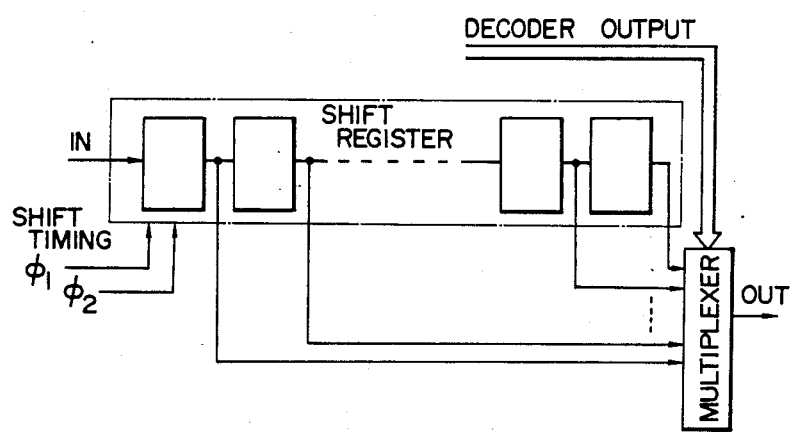
Figure 27B:
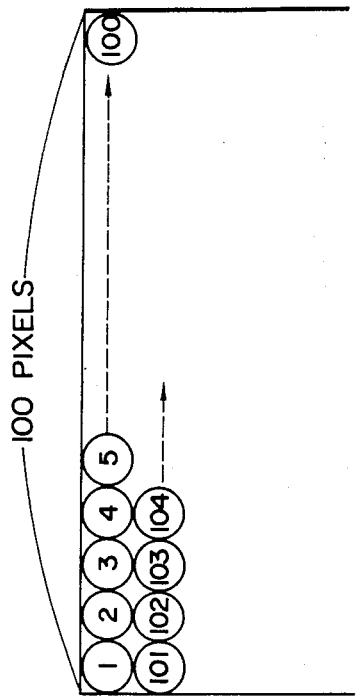
Figure 27A:
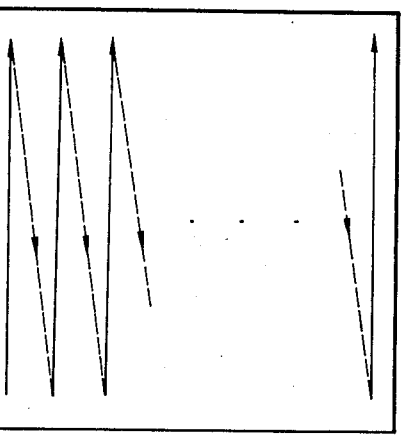
Figure 28A:
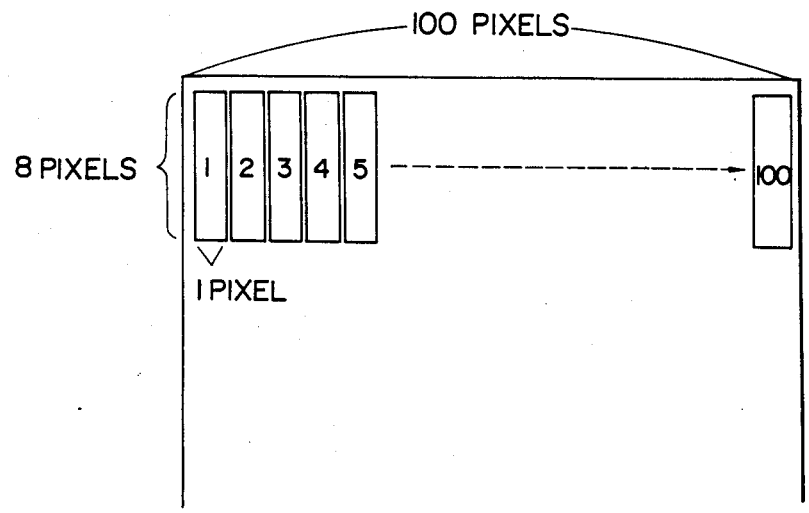
Figure 28B:
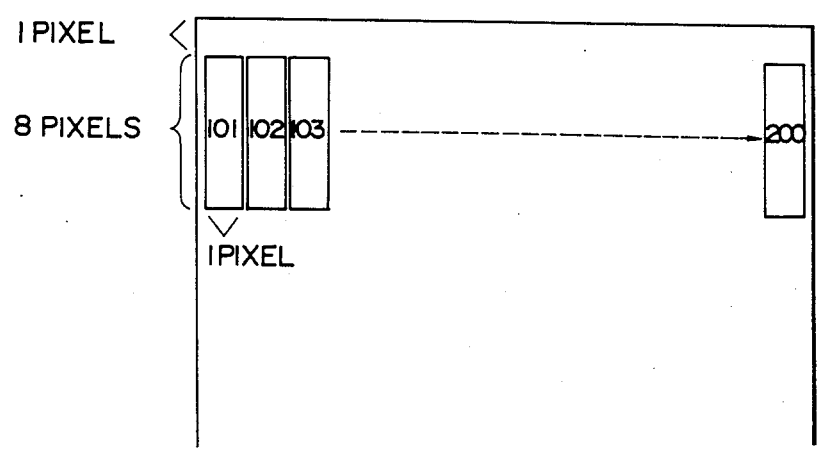
Figure 29B:
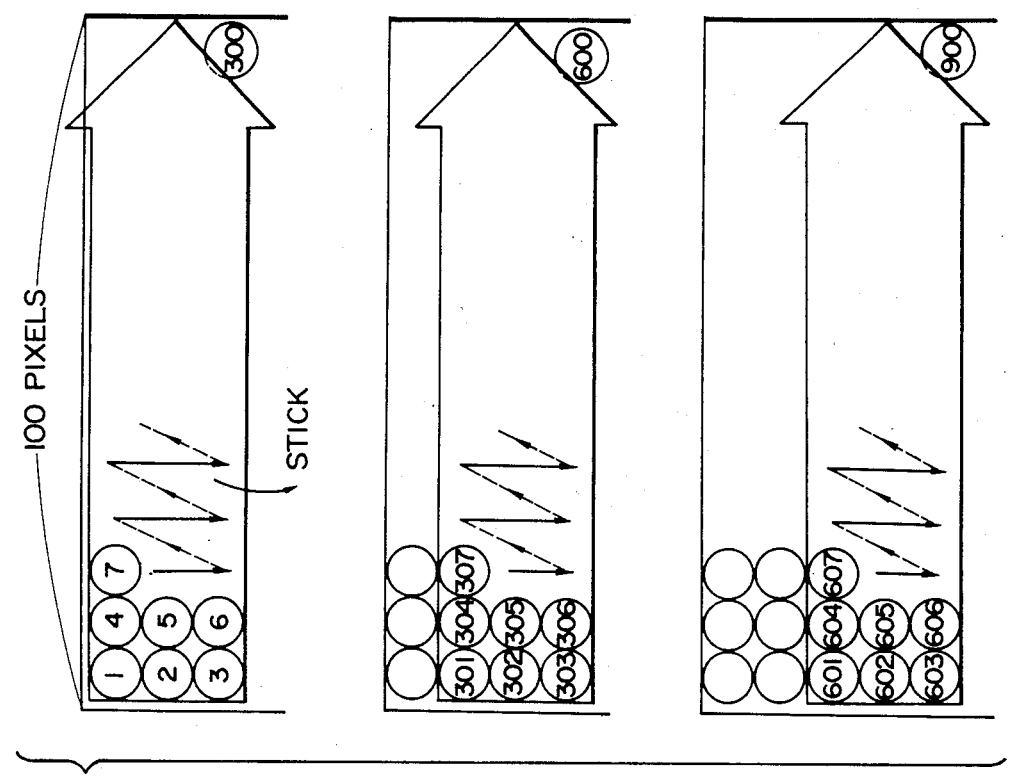
Figure 29A:
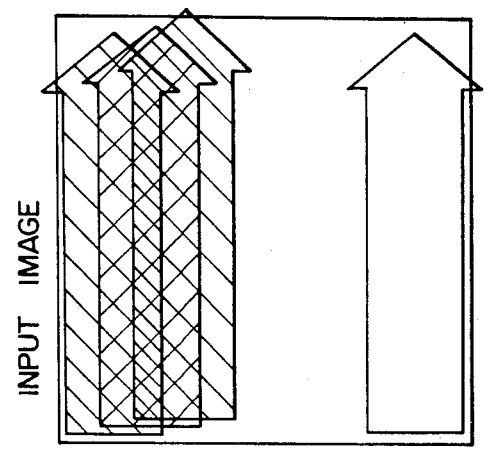
Figure 30A:
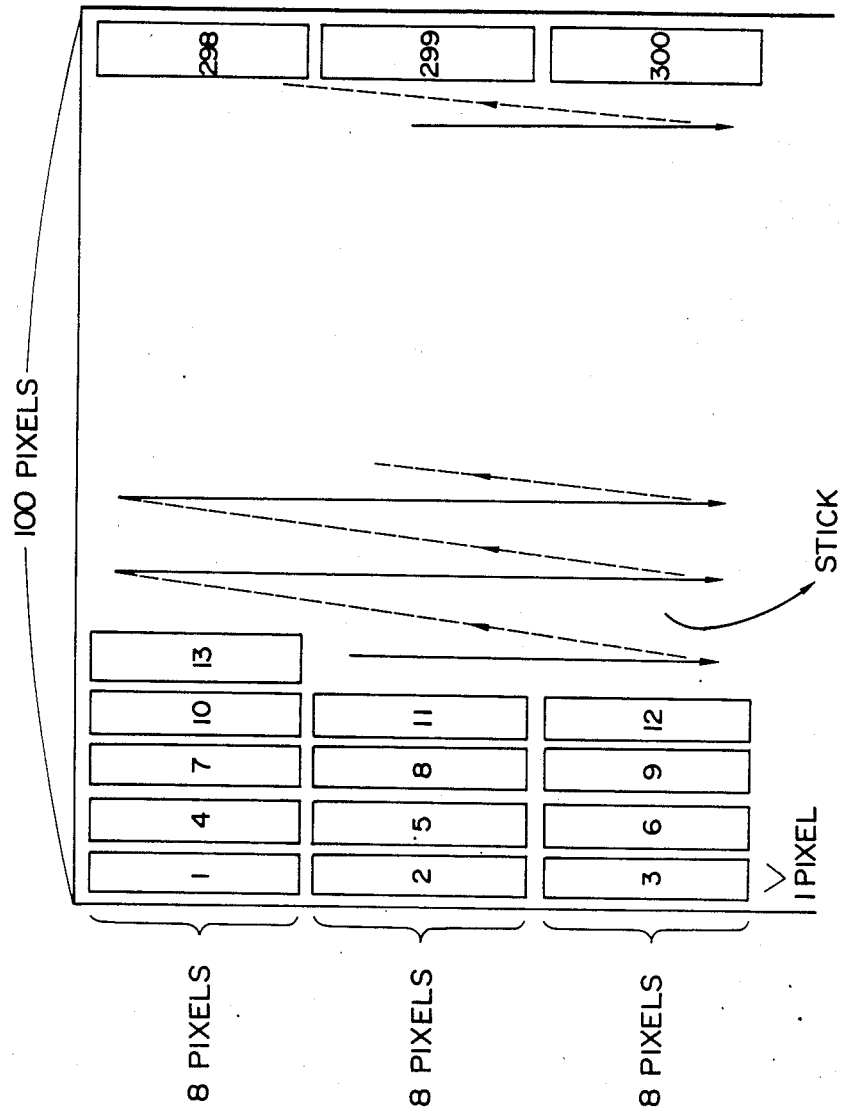
Figure 30B:
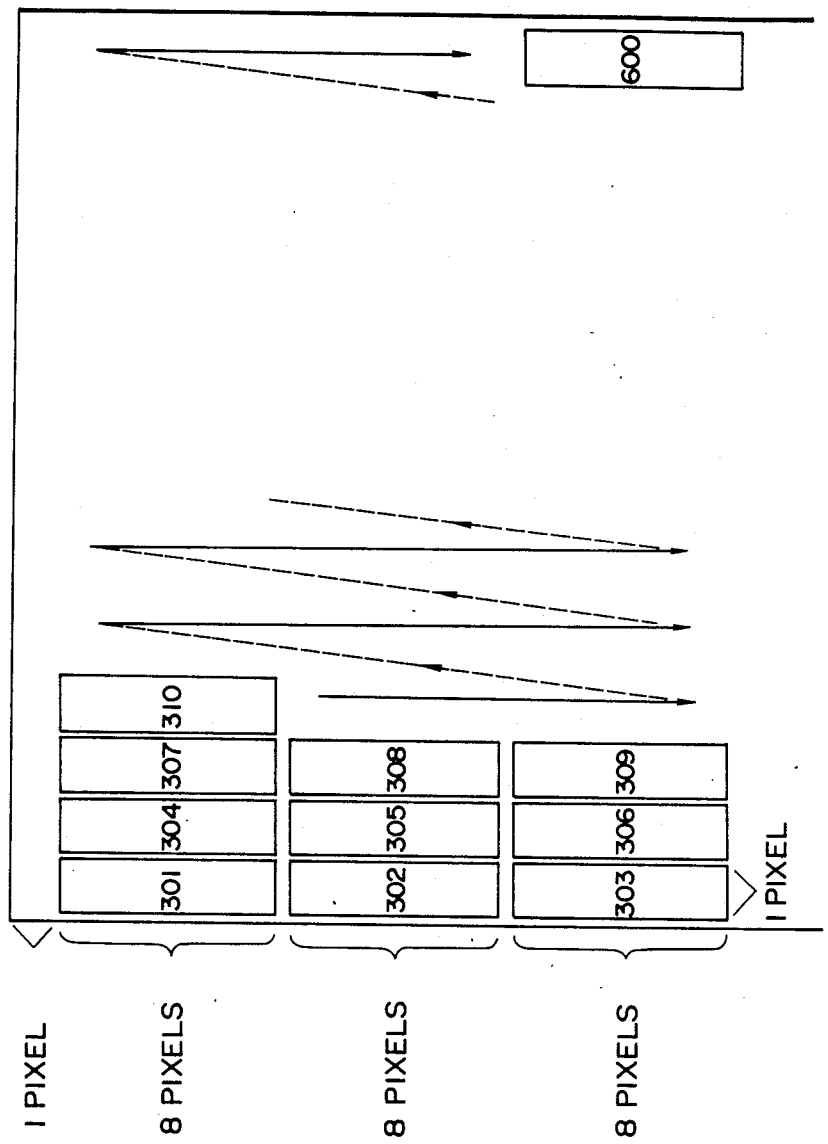
Figure 31:
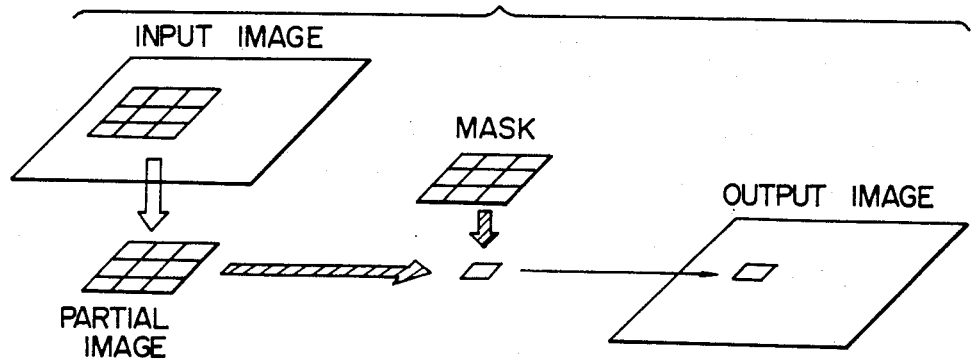
Figure 32:
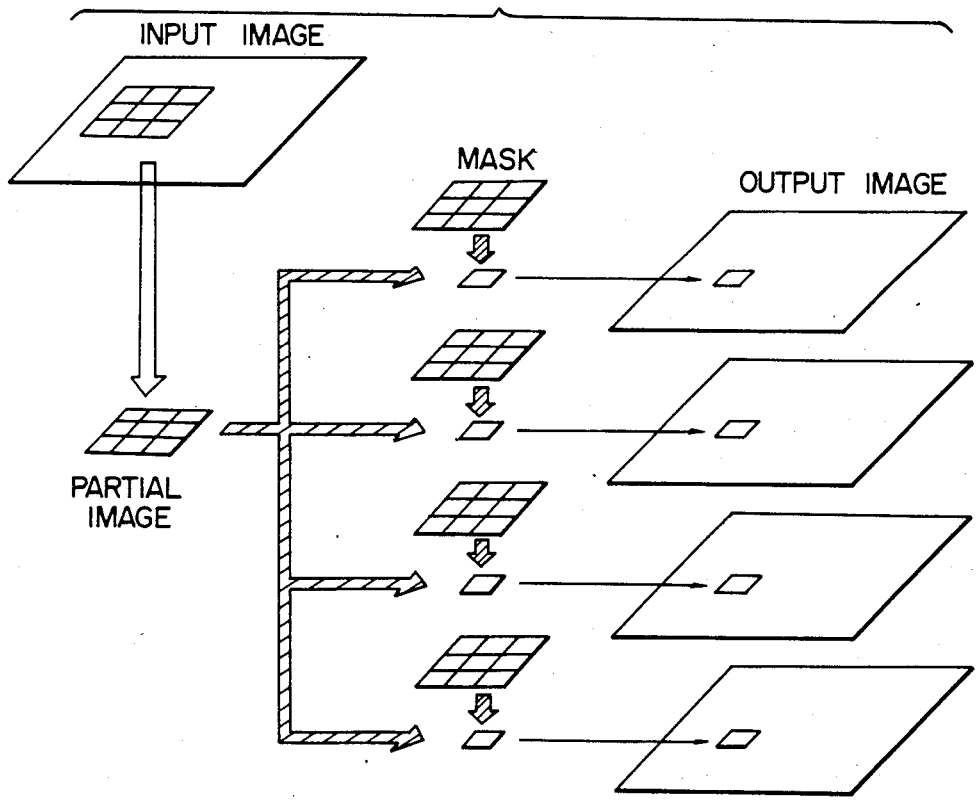
Figure 33:
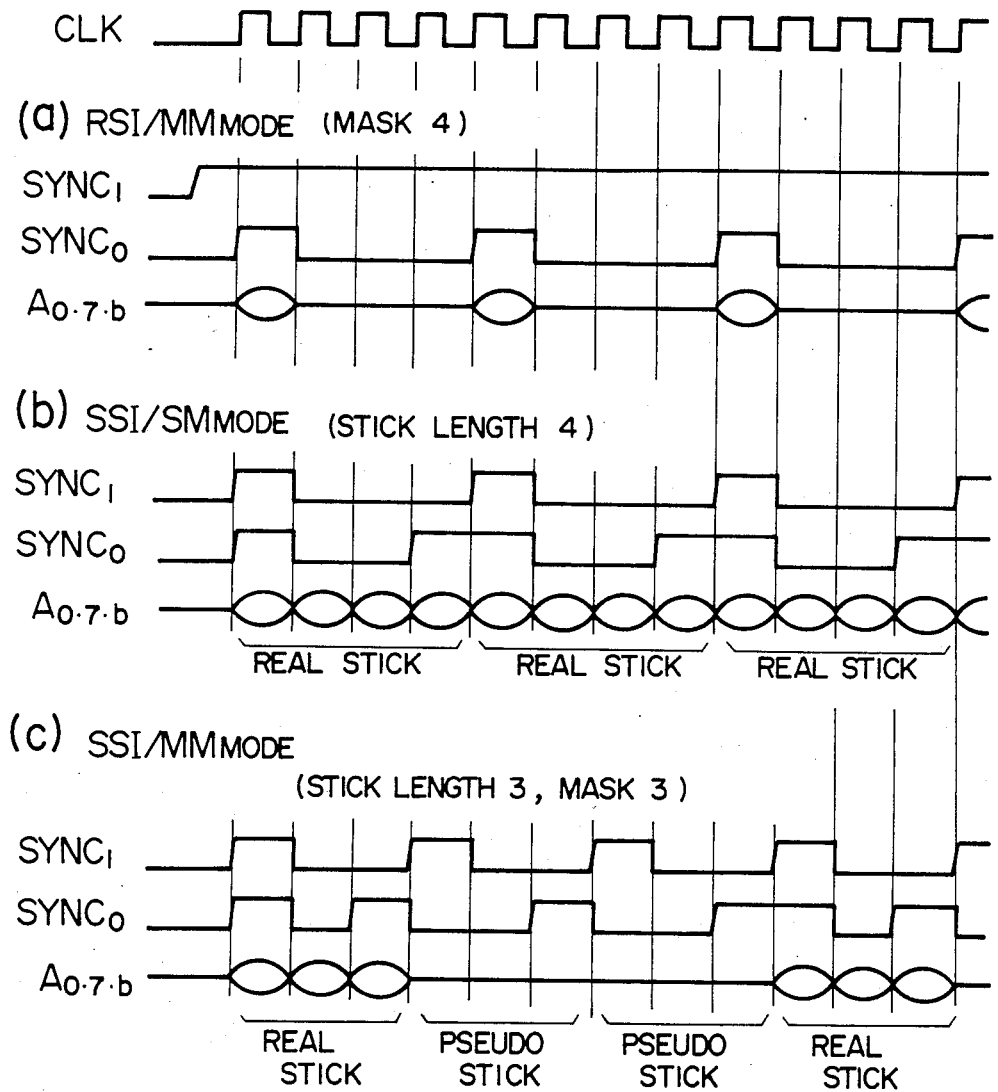

FIGS. 13A, 13B and 13C show registers which are operated by a command from the control unit and driven by two clocks $\tau$ and t, FIG. 14 shows port 1 including an input buffer, FIG. 15 shows port 2 having input/output buffers and a bilateral data transfer ability, FIG. 16 shows port 3, FIG. 17 shows port 4 which includes an output buffer and selects one of three data paths, FIG. 18 shows an internal structure of the data unit, with the data supplied from the port 1 and the port 2 through the A-bus and the B-bus being transferred to the processor unit, FIG. 19 shows an internal structure of the memory unit, with the data supplied from port 3 being written into the memory and transferred to the processor unit at an appropriate timing, FIG. 20 shows an internal structure of the processor unit which has an ability to parallelly process the data supplied from the path shown in FIG. 8 and transfer it to the linkage unit, FIG. 21 shows an internal structure of the linkage unit schematically shown in FIG. 10, FIG. 22 shows an internal structure of the evaluation unit which has the ability to process the data supplied from the port 3 and the linkage unit and transfer them to the port 4, FIG. 23 shows an internal structure of the control unit which is controlled by four external signals CLK, OPS, $\overline{RES}$ and $\overline{WE}$, processes the data supplied from the port 3 and issues command signals to other units, FIG. 24 is a time chart illustrating a relationship between a clock signal and a timing signal, FIG. 25 illustrates a data flow in each cycle, FIG. 26 schematically shows a variable shift register (VSR), FIGS. 27A and 27B illustrate scanning for a multi-valued image input, FIGS. 28A and 28B illustrate scanning for a binary image input, FIGS. 29A and 29B show a further detail of the scanning of FIGS. 27A and 27B, FIGS. 30A, 30B and 30C show further details of the scanning of FIGS. 28A and 28B, FIG. 31 illustrates a single mask mode, FIG. 32 illustrates a multi-mask mode, and FIG. 33 shows a timing of an operation synchronizing signal when the mask is used.

An image signal processor (ISP) is a partial parallel type image processing LSI which includes the same number of processor elements (PE's) as that of input pixel data used to produce one output pixel data.

A basic architecture of the ISP is discussed from the following two aspects:

① ability for high speed operation at a video rate (6 MHz, non-interlace), and

② ability for easy expansion of a partial operation area (kernel).

The present ISP, processes an image data consisting of 8 bits per pixel. Because of various restrictions arising therefrom, four PE's are mounted on one chip and those PE's operate in parallel in a single instruction multi-data stream (SIMD).

Figure 1:
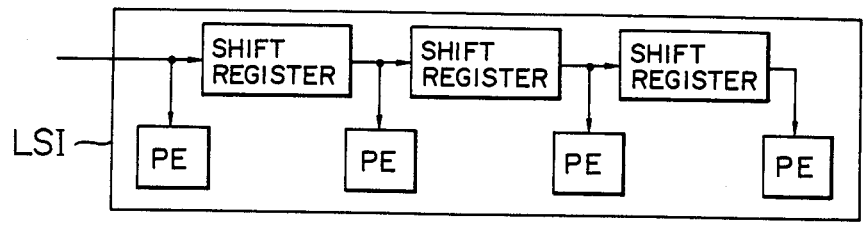
Figure 2:
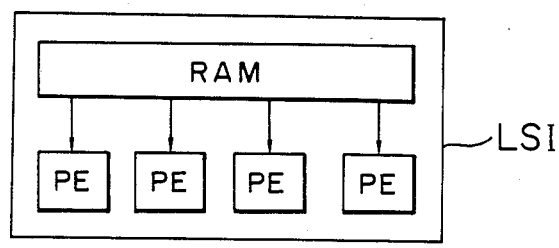

The image data is transferred to the four PE's in one chip through a shift register as shown in FIG. 1. Operands (weight coefficients, template data, etc.) used to process the image data are supplied from a RAM to the respective PE's as shown in FIG. 2.

Figure 3:
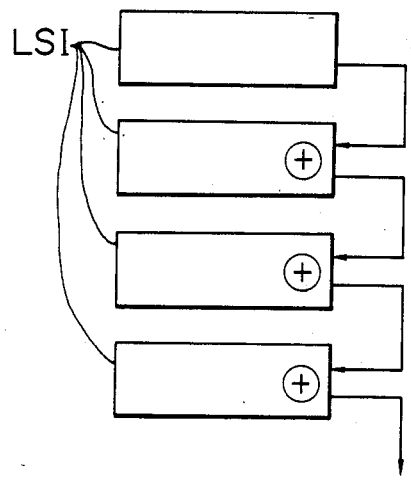

When a large kernel is processed by a plurality of LSI's, linkage operations among the LSI's are carried out as shown in FIG. 3. To this end, an arithmetic circuit for the linkage and input/output terminals for transferring the linkage data are separately provided.

Figure 4:
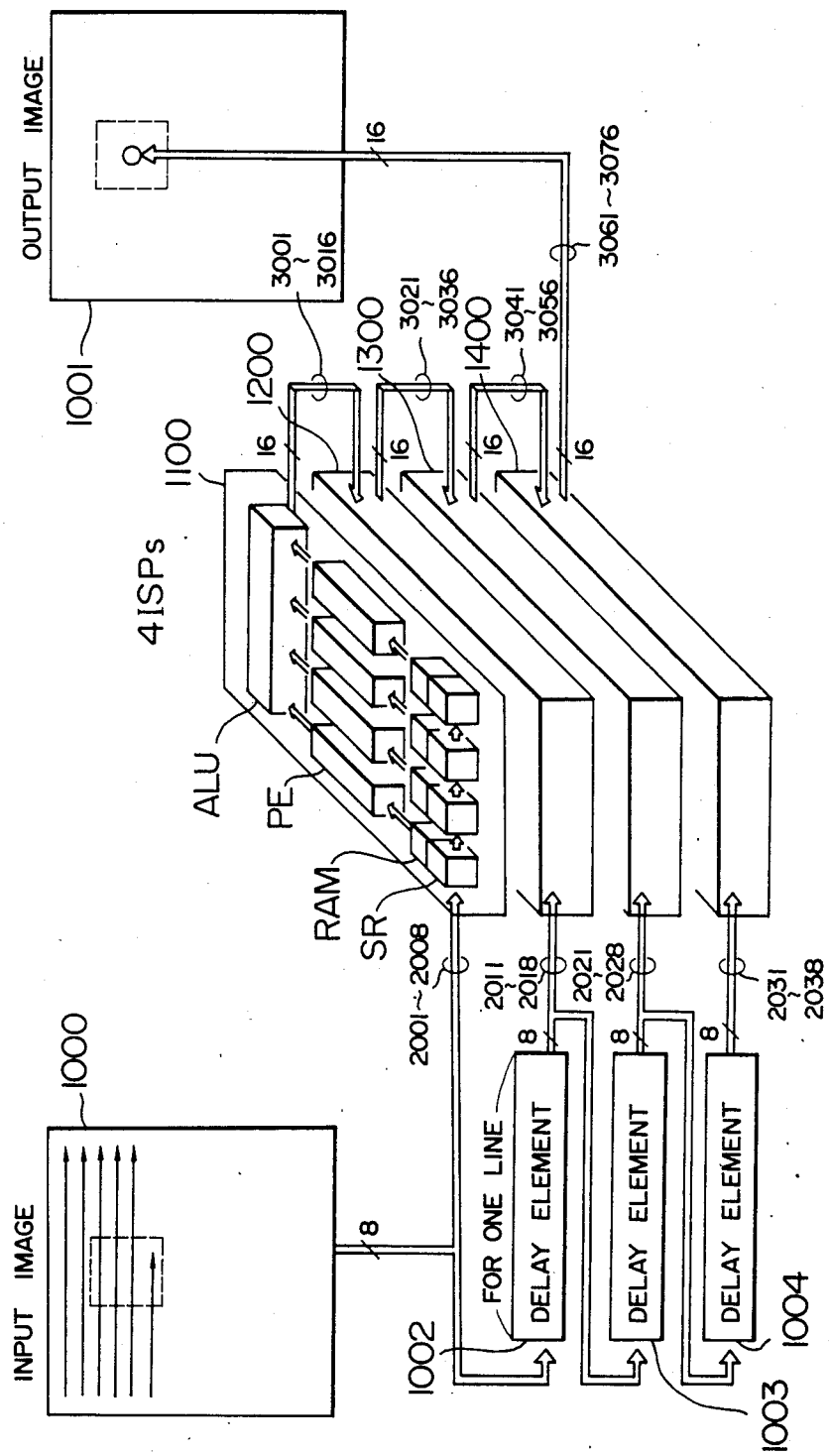

A configuration of an image processing system which uses the above ISP's is shown in FIG. 4. This system carries out image processing for 4×4 kernel at a high speed and uses four ISP's. It carries out 4×4 spatial convolution operation expressed by:

$$g(x, y) = \sum_{i=1}^{4}\sum_{j=1}^{4} w_{ij} * f(x+i-1, y+j-1)$$

where f(x, y) is an input image, g(x, y) is an output image and $w_{ij}$ is a weight coefficient. (Position of an output image is shifted left-upward).

In the system of FIG. 4, the input image is scanned from left to right and from top to bottom so that it is scanned from the top left corner to bottom corner as an non-interlaced television image is. The scanned image data is sequentially supplied to the four ISP's through three delay elements. Each delay element delays the image data by a time required to scan one line of input image data. Thus, a total of 4×4 (16) adjoining pixels of data can be taken out from 16 shift registers in the four ISP's. By preloading weight factors in the RAM, the image data in the respective shift registers are multiplied by the weight coefficients stored in the RAM by the associated PE's and the products are sequentially summed in an ALU to produce an output image data.

In the present system, the total of 16 PE's in the four ISP's operate in parallel. By adopting a pipeline system in the PE's and the ALU's, and setting a cycle time to 167 nanoseconds, an image of 256×256 pixels can be real-time processed by supplying a video signal from a television camera to an A/D converter.

By arranging the ISP's in a horizontal direction in addition to vertical direction, the kernel can be expanded two-dimensionally.

A stick scanning image scan system (disclosed in detail in U.S. patent application Ser. No. 389,498) which applies the present invention will also be described.

(I) A basic configuration of the ISP is shown in FIG. 5. As shown, the ISP comprises six units and input/output units.

(1) Data Unit

It comprises four shift registers which contribute to the transfer of an image data. Input/output image data buses are of 8-bit width and the output bus is used to expand a kernel.

(2) Memory Unit

It comprises a RAM consisting of 8-bits×64 words, in which operands such as weight coefficients and template data are stored. When an image is processed, data are supplied to PE's one byte at a time.

(3) Processor Unit

It comprises four PE's each of which parallelly processes the image data in an SIMD mode and outputs a 16-bit operation result. The construction of the PE will be explained later.

(4) Linkage Unit

It comprises a 4-input ALU and a 2-input ALU, the former contributing to a linkage operation among the PE's and the latter contributing to a linkage operation among the LSI's. Input/output data are of 16-bit width. The construction of the ALU will be explained later.

(5) Evaluation Unit

It comprises two comparators and contributes binary processing to the output data from the linkage unit and clustering processing.

(6) Control Unit

It comprises a programmable control register and controls the respective units.

The basic architecture shown in FIG. 5 utilizes pipeline processing in addition to parallel processing to process the data at a video rate. It is constructed with care regularity in order to allow LSI implementation. The supply of data in the problem to be resolved.

In the configuration of FIG. 5, data is supplied, one byte at a time, to the PE's in the processor unit from the data unit and the memory unit. The data from the data unit are the pixel data and the data from the memory unit are the operands. In the configuration of FIG. 5, the pixel data is transformed only by the operands, but primary differential operators shown in Table 1 transform the data by neighbourhood pixel data without using the operands. Thus, another byte of pixel data is supplied to each PE instead of the operands from the memory unit.

TABLE 1

| Primary differential operator |
|---|
| (1) $\sqrt{(a-d)^2 + (b-c)^2}$ (Roberts operator) |

TABLE 1-continued

Primary differential operator (2) $|a-d| + |b-c|$ (3) $[|a-b+c-d| + |a+b-c-d|]/2$ (4) $\sqrt{(A+B+C-G-H-I)^2 + (A+D+G-C-F-I)^2}$ (5) $|A+B+C-G-H-I| + |A+D+G-C-F-I|$ (6) $|E-A| + |E-C| + |E-G| + |E-I|$ (7) $|\max(A,B,C,D,F,G,H,I) - E|$ (8) $\text{sign}(B-H) \cdot |\min(A,B,C) - \max(G,H,I)|$ (9) $|A+2B+C-G-2H-I| + |A+2D+G-C-2F-I|$ (Sobel Operator)

| a | b |
|---|---|
| c | d |

| A | B | C |
|---|---|---|
| D | E | F |
| G | H | I |

The supply of the pixel data to the PE's is carried out by employing two systems shown in FIGS. 6 and 7 so that the primary differential operators shown in Table 1 are efficiently executed. An A-bus in FIGS. 6 and 7 is identical to the input bus to the data unit shown in FIG. 5. For a B-bus in FIGS. 6 and 7, a bilateral output bus which extends from the data unit shown in FIG. 5 externally of the LSI is used in order to reduce the number of terminals.

On the other hand, in an image operation which transforms the pixel data by using the operands, it is more efficient in the configuration of FIG. 5 to supply a number of image data simultaneously and directly to the respective PE's than to serially transfer the data through the shift registers in an interpolation operation which is carried out for enlargement, reduction or rotation or color processing using densities for three primary colors, red, green and blue. In order to meet the above requirement, an input architecture shown in FIG. 8 can also be adopted. A, B and LI-buses in FIG. 8 correspond to the input bus to the data unit of FIG. 5, the output bus from the data unit and the input bus to the linkage unit, respectively.

All PE's are operated in the SIMD mode in the same manner and the PE's necessary to transform the pixel data can be selected. As a result, an operation by any shape of kernel can be carried out.

The above technique is adapted to process a density image or a color image which is regarded to consist of three density images. However, for a binary image in which one pixel consists of one bit, light pixels may be handled as one unit and processed by one PE like one pixel of the density image. In this case, it is not possible to form any shape of kernel by merely selecting the PE's . Thus, the memory unit supplies two-byte of data to each PE, one byte for kernel designation and one byte for operands. In other words, the binary image operation is carried out only for the pixel data in the kernel.

(II) In addition to the primary differential operators shown in Table 1 which are classified as partial neighbourhood processing, gray and color image processing are shown in Table 2 and a pattern matching function as binary image processing are discussed in connection with the function of FIG. 5.

In FIG. 5, each PE functions to transform the pixel data (pixel data transform function), the 4-input ALU in the linkage unit functions to consolidate the output data of the PE's (transformed data consolidation function), and the 2-input ALU in the linkage unit functions to reconsolidate the output data of the 4-input ALU in the linkage unit over the plurality of LSI's (consolidated data reconsolidation function). The functions shown in Table 2 are classified in this respect as shown in Table 3. That is;

(1) Three functions are performed by two continuous operation units.
(2) For the pixel data transform function, an operation unit which primarily carries out addition and subtraction and an operation unit which primarily carries out multiplication are required.
(3) For the transformed data consolidation function and the consolidated data reconsolidation function, an operation unit which primarily carries out addition and subtraction and an operation unit which carries out an absolute value calculation operation are required.
(4) For the consolidated data reconsolidation function, a SQRT (square foot) function is also required.
(5) For each operation unit, a NOP (no operation) function for outputting an input data is required.

TABLE 2

Gray and Color Image Processing

Spatial convolution $$g(x,y) = \sum_{i=1}^{n} \sum_{j=1}^{m} w_{ij} \cdot f(x+i-1, y+j-1)$$

Difference detection method $$g(x,y) = \sum_{i=1}^{n} \sum_{j=1}^{m} |t_{ij} - f(x+i-1, y+j-1)|$$

4-Point linear interpolation $$g(x,y) = (1-\Delta x)(1-\Delta y) \cdot f(i,j) + \Delta x(1-\Delta y) \cdot f(i+1,j) + (1-\Delta x)\Delta y \cdot f(i,j+1) + \Delta x \Delta y \cdot f(i+1,j+1)$$

Color scale conversion
$$g(x,y) = \alpha R(x,y) + \beta G(x,y) + \gamma B(x,y)$$

Classification by color-distance $$g(x,y) = \sqrt{\{\alpha - R(x,y)\}^2 + \{\beta \cdot G(x,y)\}^2 + \{\gamma - B(x,y)\}^2}$$

| | |
|---|---|
| f: | gray input image |
| g: | gray output image |
| w,α,β,γ: | weight coefficient |
| R: | color image red component density |
| G: | color image green component density |
| B: | color image blue component density |
| Δx: | x-axis distance from adjacent pixel f(i,j) |
| Δy: | y-axis distance from adjacent pixel f(i,j) |

TABLE 3

Operations required for functions

| Image processing | pixel data transform function | transformed data consolidation function | consolidated data reconsolidation function |
|---|---|---|---|
| Primary differential operator (1) | −,* | NOP | +,√ |
| Primary differential operator (2) | −,\| \| | NOP | + |
| Primary differential operator (3) | +/− | +/−,\| \| | +,½ |
| Primary differential | −,\| \| | + | + |

TABLE 3-continued

| Image processing | Operations required for functions | | |
|---|---|---|---|
| | pixel data transform function | transformed data consolidation function | consolidated data reconsolidation function |
| operator (6) | | | |
| Primary differential operator (7) | −,\| \| | max | max |
| Primary differential operator (8) | NOP | min/max | −,\| \| |
| Spatial convolution | * | + | + |
| Difference detection method | −,\| \| | + | + |
| 4-point linear interpolation | * | + | + |
| Color scale conversion | * | + | + |
| Classification by color-distance | −,* | + | +,√ |
| Pattern matching | ENOR,CNT | + | + |

Based on the above results, a control configuration for the image data and the operands is shown in FIG. 9. Two distortion compensation buffers are included. The buffer for the A-bus enables the pipeline processing among the LSI's and the buffer for the B-bus compensates time distortion of the A-bus. The B-bus distortion compensation buffer allows the execution of the primary differential operators.

The memory unit is of 8 bits×64 words and 8 bytes can be read out parallelly by one address. Two-byte data is supplied to each PE, one byte being the operand and one byte designating a kernel in the binary image processing. The kernel designation data masks the data from the data unit in the binary image processing.

Only the B-bus is tri-state. Only the signal for controlling the input/output directions for the B-bus and the memory address signal are supplied from external terminals, and all other control signals are supplied from a programmable control register in the control unit.

As shown in FIG. 9, a total of 5-bytes of operation data are supplied to each PE from the data unit and the linkage unit. They are eventually selected and combined into two bytes, which are supplied to an ALU (A) in a preceding stage of the PE. The ALU (A) has a bit-by-bit logical operation function in addition to an additional subtraction function.

An output of the ALU (A) is supplied to an ALU (B) in a suceeding stage of the PE. The ALU (B) has functions of an absolute value calculation and counting the number of "High" level bits, in addition to a multiplication function. A 16-bit operation result of the ALU (B) is supplied to the linkage unit. For the PE's which are not required to form the kernel, the output of the ALU's (B) are cancelled and data which do not affect the operation of the linkage unit is outputted (FIG. 10).

The 4-input ALU of the linkage unit shown in FIG. 5 is divided into three arithmetic units AU's (C) and an AU (D) in FIG. 10. The AU's (C) each have an addition/subtraction function, and the AU (D) has an absolute value calculation function, a division by $2^n$ (n being an integer from 0 to 8) function. The 2-input ALU (FIG. 5) is divided into two arithmetic units AU (E) and AU (F) each of which has the same function as the AU (C) and AU (D), respectively.

TABLE 4

| Stages | Functions of Operation Circuits | | | |
|---|---|---|---|---|
| | Functions | | | |
| A | ADD | SUB | AND | |
| | OR | NOR | ENOR | NOP |
| B | MUL | MAX | MIN | |
| | ABS** | NEG** | CNT*** | NOP |
| C | ADD | SUB | MAX | MIN |
| D | ABS* | DIV | NOP | |
| E | ADD | SUB | MAX | MIN |
| F | ABS* | DIV | NOP | |

*ABS: Absolute value
**NEG: Negative value
***CNT: High-level-bit counting

The operation circuits described above are isolated by registers as shown in FIG. 10 and each operation circuit constitutes one pipeline stage. Thus, the number of pipeline stages in the processor unit and the linkage unit is eight.

The functions of the stages in FIG. 10 are shown in Table 4 and the processing functions of the present ISP are shown in Table 5.

TABLE 5

| | ISP Processing Functions |
|---|---|
| Image | Processing |
| Binary Image | · Inter-image logical operation (AND, OR, EOR, ENOR) |
| | · Expansion/reduction |
| | · Pattern matching |
| Gray Image | · Inter-image arithmetic operation (Addition, Subtraction) |
| | · Spatial convolution (Smoothing, Raplacian, etc.) |
| | · Non-linear approximation operation |

| a | b |
|---|---|
| c | d |

· $|a-d| + |b-c|$
· $(a-d)^2 + (b-c)^2$
· $[|a-b+c-d| + |a+b-c-d|]/2$

| A | B | C |
|---|---|---|
| D | E | F |
| G | H | I |

· $|A+B+C-G-H-I| + |A+D+G-C-F-I|$
· $|E-A| + |E-C| + |E-G| + |E-I|$
· $|E-B| + |E-D| + |E-F| + |E-H|$
· $|A+2B+c-G-2H-I| + |A+2D+G-C-2F-I|$
· $|max(A,B,C,D,F,G,H,I) - E|$
etc.

· 4-point linear interpolation
· 9-point square interpolation
· 16-point cubic interpolation
· Difference detection method
· Fixed binary processing

TABLE 5-continued
ISP Processing Functions

| Image | Processing |
|---|---|
| | · Floating point binary processing |
| | · Quasi-media filtering |
| | · max[min(A,B,C), min(D,E,F), min(G,H,I)] |
| | · min[max(A,B,C), max(D,E,F), max(G,H,I)] |
| Color Image | · Primary color processing (ex. $\|R-G\| + \|G-B\| + \|B-R\|$) |
| | · Density conversion ($\alpha R + \beta G + \gamma B$) |
| | · Color conversion $\begin{pmatrix} R \\ G \\ B \end{pmatrix} = [M] \begin{pmatrix} x \\ y \\ z \end{pmatrix}$ |
| | · Classification by color-distance |
| | · $\|R-\alpha\| + \|G-\beta\| + \|B-\gamma\| \cdot (R-\alpha)^2 + (G-\beta)^2 + (B-\gamma)^2$ |

(III) The embodiments of the present invention will now be explained with reference to the drawings. They disclose image signal processors as preferred embodiments of the present invention.

<External View of Image Signal Processor>

FIG. 11 shows an external view of the ISP of the present invention. It has total of 64 pins which are classified as follows.

Data Bus A (pin numbers 1–9)

Terminals $A_0$–$A_7$ are used to input one-pixel data of a multi-valued image or eight-pixel data of a binary image. For the multi-valued pixel data, the 8-bit pixel data may be represented by an absolute value or a two's complement.

A terminal Ab is used to input a masking binary data which identifies an effective processing area of an image data inputted through the terminals $A_0$–$A_7$.

The terminals $A_0$–$A_7$ and $A_b$ are associated with a first port to be described later.

Data Bus B (pin numbers 56–64)

Terminals $B_0$–$B_7$ are used to input and output one-pixel data of the multi-valued image or eight-pixel data of the binary image through a bilateral bus. When the multi-valued image is inputted, either the absolute value representation or the two's complement representation may be used independently from the data bus A.

A terminal $B_b$ is used to output the binary data supplied from the terminal $A_b$.

The terminals $B_0$–$B_7$ and $B_b$ belong to a second port to be described later.

Linkage Data Input Bus (pin numbers 17–32)

Terminals $LI_0$–$LI_{15}$ are used to input processing data and data to the memory unit and the control unit.

The terminals $LI_{15}$–$LI_{15}$ belong to a third port to be described later.

Linkage Data Output Bus (pin number 33–40 and 42–49)

Terminals $LO_0$–$LO_{15}$ are used to output operation results and data to the memory unit and the control unit of another processor. The operation result is outputted by a 16-bit two's complement representation.

The terminals $LO_0$–$LO_{15}$ belong to a fourth port to be descibed later.

Binary Data Output (pin number 50)

A terminal NBR is used to output the operation result of the binary data, a binary data output when the multi-valued image is bineay and a binary degree of match when the multi-valued image and the binary image are pattern-matched.

The terminal NBR also belongs to the fourth port.

Operation Select (pin number 53)

A terminal OPS is used for a select signal. When this signal is a "Low" level, a set-up mode is selected and when it is a "High" level, an operation execution mode is selected. The registration of the data in the control unit and the storing of the data in the memory unit are carried out in the set-up mode.

The terminal OPS belongs to the control unit.

Clock (pin number 54)

A clock signal applied to a terminal CLK is used to write or update in the memory unit and the control unit in the set-up mode and input/output and process data in the operation execution mode. Those operations are carried out in synchronism with the clock signal.

The terminal CLK belongs to the control unit.

Write Enable (pin number 51)

A terminal WE is used to input a write enable signal. By setting the write enable signal to a "Low" level when the operation select signal (OPS) is "Low" level, writing of data into the memory unit and the control unit is enabled.

The terminal WE belongs to the control unit.

Memory Register Address (pin numbers 10–13)

Terminals $MRA_0$–$MRA_3$ are used to input a memory register address. They are used to address a register where content is to be updated in the set-up mode and address data to be read from the memory unit in the operation execution mode.

The terminals $MRA_0$–$MRA_3$ belong to the control unit.

Reset (pin number 52)

A terminal $\overline{RES}$ is used to input a reset signal. When the operation select signal at the terminal OPS is in the set-up mode and the clock signal is a "Low" level and the reset signal is "Low" level, a control register in the control unit is reset. Under the reset state, initialization is done to allow the execution of the convolution operation (which is one of the image processing operations).

The terminal $\overline{RES}$ belongs to the control unit.

Bus Direction (pin number 55)

A terminal BD is used to input a bus direction signal. It is used to determine input/output directions of $B_0$–$B_7$ of the data bus B. When the signal is a "Low" level, $B_0$–$B_7$ are output terminals, and when it is "High" level, $B_0$–$B_7$ are input terminals.

The terminal BD belongs to the port P2.

Operation Synchronization Signal (pin numbers 14 and 15).

Terminals $SYNC_0$–$SYNC_1$ are used to input an operation synchronization signal. This signal synchronizes the operations among the units and applied in synchronism with the image data. An input pattern of the operation synchronization signal changes depending on an input system of the image data.

The terminals $SYNC_0$–$SYNC_1$ also belong to the control unit.

Power Supply (pin number 41)

A terminal Vcc is used to supply a power.

Ground (pin number 16)

A terminal Vss is used as a ground terminal.

<Overall System Configuration>

FIG. 12 shows an overall system configuration in one embodiment of the present invention. The same reference numerals designate like parts in FIGS. 11 and 12. An image signal processor 100 comprises first to fourth ports P1–P4, a data unit 101, a memory unit 102, a processor unit 103, a linkage unit 104, an evaluation unit 105 and a control unit 106.

The first port P1 has a function to input the image data to be processed and comprises a data bus A (input terminals $A_0$–$A_7$ and $A_b$), an input buffer 107 and a bus (lines 8001–8008 and 8009). The image data is applied to the input buffer 107 from the terminals $A_0$–$A_7$ and $A_b$ through the bus (lines 8001–8008 and 8009) and registered data are transferred to the data unit 101 and the processor unit 103 through buses (lines 7111–7118 and 7101–7109). When the data is transferred to the data unit 101, the buffer register 107 transfers the data through a variable shift register for controlling a delay time of the data in order to eliminate mismatching of the timing of the data. This ability to adjust the delay time resolves a problem of mismatching of arrival time of the data to the operation unit, which problem is encountered when a plurality of image signal processors 100 are operated in a pipeline system. The detail of the input buffer 107 is shown in FIG. 14 and will be explained later.

The second port P2 has an input function of the image data and an output function of the image data, one of the functions being selectively used. It comprises an input/output buffer 108, an input/output data bus B ($B_0$–$B_7$ and $B_b$), a bus direction BD for determining input/output directions of the bus and a bus (lines 8055, 8056, 8057–8064). The input/output buffer 108 functions as either the input buffer or the output buffer depending on the signal at the terminal BD.

When the input/output buffer 108 functions as the input buffer, it reads in the image data from terminals $B_0$–$B_7$ and transfers the data to the data unit 101 and the processor unit 103. Like the input buffer 107, the input/output buffer 108 transfers the data to the data unit 101 through a variable delay shift register. By combining the ability of the input/output buffer 108 to adjust the data transfer delay cycle with the ability of the input buffer 107, various image processing operations can be performed.

On the other hand, when the input/output buffer 108 functions as the output buffer, the image data from the data unit 101 is outputted at the terminals $B_0$–$B_7$ and $B_b$ through the bus (lines 8057–8064 and 8056). By this output function, a plurality of image signal processor (LSI) can be serially connected (by connecting the terminals $B_0$–$B_7$ and $B_b$ of one processor to the terminals $A_0$–$A_7$ and $A_b$ of other processor) to parallelly carry out a large scale image processing (FIG. 4). The detail of the input/output buffer 108 is shown in FIG. 15 and will be explained later.

The third port P3 has a data input function and comprises terminals $LI_0$–$LI_{15}$, an input buffer 109 and a bus (line 8017–8032). In the set-up mode, the port P3 is used to input data (basic data for image processing) to be stored in the memory unit 102 and data (necessary for control) to define the control of the control unit 106, and is also used to input data to the fourth port. In the operation execution mode, the third port P3 is used to supply data to the processor unit 103, the linkage unit 104, the evaluation unit 105 and the fourth port P4 which is supplied to another image signal processing unit. The detail of the input buffer 109 is shown in FIG. 16 and will be explained later.

The fourth port P4 has a function to output the input data and comprises an output buffer 110, terminals $LO_o$–$LO_{15}$, a terminal BNR and a bus (lines 8050, 8033–8040, 8042–8049). The output buffer 110 selects one of the output data from the linkage unit 104, the data stored in the buffer 109 of the third port P3, the output data of the evaluation unit 105 and the output of the control unit 106 by a selection signal from the control unit 106 and outputs the selected data to the terminals $LO_0$–$LO_{15}$ and BNR. The detail of the output buffer 110 is shown in FIG. 17 and will be explained later.

The data unit 101 transfers the image data supplied from the input buffer 107 through the bus (lines 7101–7109) to the input/output buffer 108 of the second port P2 through a bus (lines 1401–1409), and parallelly outputs the image data in the shifted stages and transfers them to the processor unit 103. The data transferred of the processor unit are 8 bytes in total and are transferred through buses (lines 1121–1128, 1131–1138, 1221–1228, 1231–1238, 1321–1328, 1331–1338, 1421–1428 and 1431–1438). The data unit 101 also parallelly outputs the data supplied from the input/output buffer 108 through the bus (lines 7201–7208) and transfers them to the processor unit 103. One of those functions is selected. The data unit 101 supplies data compatible with the parallel operation carried out in the processor unit 103. The data unit 101 in the present embodiment supplies eight bytes of data per machine cycle to the processor unit 103. By the parallel data supply function of the data unit 101, the parallel image processing in the processor is allowed. A detail of the data unit 101 is shown in FIG. 18 and will be explained later.

The memory unit 102 supplies the basic data (constant data such as weight coefficients in the convolution operation) necessary for the image signal processing to the processor unit 103. The constant data are written through the third port P3 prior to the execution of the image signal processing. Particularly, the constant data registered in the input buffer 109 through the input terminals $LI_0$–$LI_{15}$ and the bus (lines 8017–8032) are stored in the memory unit 102 through the bus (lines 7301–7316) by a command from the control unit 106. The memory unit 102 is a rewritable random access memory, and various image processing operations can be carried out by rewriting the data. Eight bytes of data per machine cycle are supplied from the memory unit 102 to the processor unit 103 through the buses (lines 2101–2108, 2111–2118, - - -, 2411–2418) and correspond to the data quantity supplied parallelly from the data until 101. The detail of the memory unit 102 is shown in FIG. 19 and will be explained later.

The processor unit 103 carries out the image processing operation. It receives 20 bytes of data in total from the data unit 101, the memory unit 102, the first port P1

(input buffer 107), the second port P2 (input/output buffer 108) and the third port P3 (input buffer 109) through their respective buses, carries out the parallel operation and output 4 words of a two byte operation result. These outputs are supplied to the linkage unit 104 through the buses (lines 3171-3186, 3271-3286, - - -, 3471-3486). The detail of the processor unit 103 is shown in FIG. 20 and will be explained later.

The linkage unit 104 receives the operation result of the processor unit 103 and receives the data supplied from the third port P3, through the bus (lines 7301-7316) and carries out the linkage operation by an operation command (not shown) from the control unit 106. In the present embodiment, it carries out the operation for four words (16 bit length) of data from the processor unit 103 and the operation for the result thereof and the data from the input buffer 109. The result of the linkage operation is supplied to the evaluation unit 105 through the bus (lines 4221-4236) and to the output buffer 110 through the bus (lines 4161-4176). The detail of the linkage unit 104 is shown in FIG. 21 and will be explained later.

The evaluation unit 105 receives the output data of the linkage unit 104 and the data registered in the third port P3 through their respective buses, subjects the data to binary processing and clusters them and supplies the results to the output buffer 110 in the fourth port P4 through the buses (lines 5001-5016, 5021-5036, - - -, 5301). Comparison data necessary to carry out the binary processing and the clustering are written into the registers in the evaluation unit through the input buffer 109 prior to the execution of the operation (that is, in the set-up mode). The write command is issued from the control unit 106. By the binary processing and clustering functions, the evaluation unit 105 can evaluate the image processing. The detail of the evaluation unit 105 is shown in FIG. 22 and will be explained later.

The control unit 106 controls the ports and the units in the image signal processor 100. The unit 106 includes a plurality of registers (called control registers) to define the control commands. In the setup mode, necessary data are inputted through the third port P3 and the buses and stored in the control registers. Since the data flows and the functions of the respective units are determined by the contents of the control registers, various image signal processing operations can be carried out by rewriting the contents of the control registers. The control unit 106 receives the address data to specify the addresses of the memory and the registers through $MRA_0-MRA_3$ and the bus (lines 8010-8013), the synchronizing signals through $SYNC_0-SYNC_1$ on the lines 8014-8015, the clock through CLK on the line 8054, the operation select signal through OPS on the line 8053, the reset signal through $\overline{RES}$ on the line 8052 and the write enable signal through $\overline{WE}$ on the line 8051. Based on these signals, clock and data, commands necessary for the control are issued to the respective units and ports. A detail of the control unit 106 is shown in FIG. 23 and will be explained later.

In the image signal processor 100 shown in FIG. 12, the processor unit 103, the linkage unit 104 and the evaluation unit 105 are configured in a pipeline system so that they can carry out the image processing operation at a high speed. In the present embodiment, in order to execute the operation from the data input to the operation result output in 167 nanoseconds, a maximum operation cycle is 6 MHz. Through this high speed operation, the image data of a non-interlaced television image of 256×256 pixels can be real-time processed.

A symbol " ⇒ " in FIG. 12 indicates a data bus and the direction of the arrow indicates a flow of the data. A symbol " ⇒ " indicates an address bus and the direction of the arrow indicates a direction of the address data. A numeral in the bus shown by the wide line (for example, numeral 16 in " 16 ") indicates the number of lines in the bus. Four digit numerals assigned to the bus indicates a line number. Accordingly, it will be readily understand which line is connected to which unit. Buses not explained in the above description are briefly explained below. An 8-bit bus comprising lines 7211-7218 is a data bus for supplying the data from the input/output buffer 108 to the processor unit, 16×4+7 buses comprising lines 6001-6016, 6021-6036, - - -, 6101-6107 transfer the data from the control unit 106 to the output buffer 110. Twenty three address lines from the control unit 106 comprise lines 6221-6222, 6225, 6227-6228, 6351-6352, 6354-6365, 6321-6324, portions of which are connected to the units 102 and 105 and the output buffer 110. The numerals for those signal lines and the data lines are used throughout the drawings.

The image data supplied from the input buffer 107 and the input/output buffer 108 and the image data supplied to the processor unit 103 through the input buffer 109 are 8-bit data and may be either an absolute value representation or a two's complement representation. On the other hand, the operation data supplied to the linkage unit 104 through the input buffer 109 and the operation data supplied from the output buffer 110 are 16-bit data and a two's complement representation. Since the truncation up to 8 digits is carried out in the linkage unit, the present LSI 100 has an effective number of digits of 16 and a precision of a 24-digit dynamic range.

Since the processor unit 103 of the LSI 100 has four processor elements, four pixels or 32 pixels can be simultaneously processed for the 8 bits per pixel, gray image or one bit per pixel binary image, respectively. For an overflow or an underflow which occurs during the operation, an approximation operation in the effective digit range is carried out, and the occurrences of the overflow and underflow are stored in the status registers in the control unit 106. The contents of the status registers can be read out at the terminals $LO_0$--$LO_6$ through the output buffer 110 after the operation.

In FIG. 12, the image processing operation is carried out in the following manner. Prior to the image processing operation, an operation to be executed (for example, convolution operation) is selected and data necessary for the selected operation is supplied to the image signal processor 100 from an external computer or a keyboard. The terminal OPS is set to a "Low" level to set the set-up mode. The control data is supplied to the terminals $LI_0-LI_{15}$ and is stored in the input buffer 109. Thereafter, an address for specifying one of the control registers is supplied to $MRA_0-MRA_3$ and the write enable signal is supplied to the terminal $\overline{WE}$ so that the stored data is loaded in the control register of the control unit 106. By the establishment of the data in the control register, the control signals are transmitted to the processor 103, the linkage unit 104 and the evaluation unit 105 through signal lines (not shown) to define the operation functions of the respective units. The basic data of the memory unit 102, which are supplied to the input buffer 109, are sequentially stored in the unit 102. The control signals are also transmitted to the buffers in the four ports P1–P4 to define the functions after the series of set-up operations, and the terminal OPS is set to the operation execution mode.

The operation is executed in the following manner. Assume that the control unit 106 has defined the functions of the units as follows. The first port P1 functions to input the multi-valued image data, the data unit 101 functions to transfer the image data supplied from the port P1 to the port P2 and parallelly supply the image data to the processor unit 103, the port P2 functions to externally output the data transferred from the data unit 101, the processor unit 103 functions to calculate a product of the 8-byte image data transferred from the data unit 101 and the 8-byte basic data read from the memory unit 102, the linkage unit 104 functions to sum the 4-word ($4 \times 16$) operation results from the processor unit 103 and add the sum to the data (image processing data) supplied from the third port P3, and the fourth port P4 functions to select the operation result data of the linkage unit from the input data and externally output it. No function is defined for the evaluation unit 105. The functions of the units are defined by the commands from the control registers of the control unit 106.

The image data is applied to the port P1, then it is transferred to the data unit 101 in synchronism with the timing signal. The data is serially shifted through the register in the data unit 101 in synchronism with the timing signal and is transferred to the port 2. The port 2 externally outputs the input data. The data unit 101 parallelly outputs the data of the blocks of the internal register in synchronism with the timing signal. The processor unit 103 instantly carries out a multiplication operation of the input image data and the basic data from the memory unit and outputs the product to the linkage unit 104. The linkage unit 104 sums the outputs of the processor unit 103 and adds the sum to the image processing data from the port 3 and outputs the sum to the port 4. The port 4 externally outputs the sum. The series of steps described above are timed and sequentially executed. Accordingly, by supplying the image data to the port P1, the operation result is instantly obtained at the port P4.

In the above operation, one of the operation functions of the processor shown in FIG. 12 has been selected. The operation function of the processor need not be limited to that described above. By rewriting the contents of the control registers, more processings (for example, pattern matching, filtering, binary processing, density conversion, smoothing, outline emphasis, character extraction, 4-point linear interpolation, cubic interpolation, color scale conversion and classification by color-distance) can be attained.

In the present invention, four pixels are parallelly processed for the 8 bits per pixel of data. By connecting a plurality of such processors, any number (N) of pixels can be processed at a high speed and the system has a high expandability.

<Configurations of Respective Units>

Details of the units and the buffers shown in FIG. 12 are now explained. In FIGS. 14 et seq, the registers and counters shown by blocks similar to that of FIG. 13A are operated by timing signals $\phi_1$ (line 6411) and $\phi_2$ (line 6412) from the control unit 106, the registers shown by blocks similar to that of FIG. 13B are operated by timing signals $\tau_1$ (line 6421) and $\tau_2$ (line 6422) from the control unit 106, and the registers and the counters shown by blocks similar to that of FIG. 13C are operated by either $\phi_1$ and $\phi_2$ or $\tau_1$ and $\tau_2$. The signals $\phi_1$, $\phi_2$, $\tau_1$ and $\tau_2$ are shown in FIG. 24. The timing signals $\phi_1$ and $\phi_2$ are produced in the operation execution mode and the timing signals $\tau_1$ and $\tau_2$ are produced in the set-up mode. The signals $\phi_1$, $\phi_2$, $\tau_1$ and $\tau_2$ are generated based on the clock signal.

ⓐ Input Buffer 107 (Port P1)

The detail of the input buffer 107 is shown in FIG. 14. Numeral 711 denotes a 9-bit variable stage shift register which sequentially shifts the image data supplied from the terminals $A_0$–$A_7$ and $A_b$ through the bus (lines 8001–8008, 8009) in accordance with the shift timing (supplied from the control unit, not shown) and supplies it to the data unit. The number of shift stages is variable. When the shift register 711 has 16 shift stages, the data can be outputted from any one of the 16 stages. The output stage is designated by a decoder output signal supplied through the bus (lines 7121–7136). For a given shift timing, a delay time is adjustable by selecting the output stage. Numeral 713 denotes a decoder which receives a four-bit command (P1-SKEW-A0~P1-SKEW-A3) to designate the output stage of the shift register, from the control unit through the bus (lines 6041–6044) and decodes it to 4-$\tau_0$-16. The decoder output is supplied to the variable stage shift register 711 to designate the output stage. The variable stage shift register 711 is operated by the signals $\phi_1$ and $\phi_2$ (timing signals transferred through the lines 6411 and 6412) from the control unit 106. At the fall of $\phi_1$, the data on the signal lines 8001–8009 is read, and at the rise of $\phi_2$, the data is outputted to the lines 7101–7109. The register 712 reads in the data on the lines 8001–8008 at the fall of $\phi_1$, and outputs the read-in data on the lines 7111–7118 at the rise of $\phi_2$. By the shift register 711, the mismatching of the arrival of the operation data which occurs when a plurality of image signal processors 100 are used can be compensated.

FIG. 26 schematically shows the variable stage shift register. It comprises a shift register and a multiplexer which receives data from the respective stages of the shift register and selects one of them by the decoder output.

ⓑ Input/Output Buffer 108 (Port P2)

The detail of the buffer 108 is shown in FIG. 15. Numeral 721 denotes an 8-bit variable stage shift register which sequentially shifts the input image data in accordance with the shift timing, not shown, and outputs it to the data unit through the bus (lines 7201–7208). Numeral 722 denotes a tri-state buffer which passes the data on the bus (lines 1401–1408) when the signal (bus direction signal) supplied from the terminal BD through the line 8055 is a "Low" level, and outputs it on the bus (lines 8056–8064). When the signal from BD is a "High" level, the buffer 722 does not permit the passage of data. Thus, the buffer 722 has a function to open a gate when the signal is a "Low" level and close the gate when the signal is a "High" level. Numeral 724 denotes a decoder which outputs a decoded result on the bus (lines 7221–7228) in response to a command (on the lines 6045–6047) from the control unit 106.

When the signal applied to BD is a "Low" level, the buffer 108 is used as the output buffer. The image data from the data unit passes through the tri-state buffer 722 and outputted to the terminals $B_0$–$B_7$ through the signal lines 8057–8064. When the signal applied to BD is a "High" level, the tri-state buffer 722 assumes a high impedance. The data outputted from the data unit 101 to the signal line 1409 is outputted to the terminal Bb through the output buffer 725 and the signal line 8056 irrespective of the signal applied to BD.

The variable stage shift register (VSR-B) 721 can have any number of delay stages between 1 and 8. It is constructed as shown in FIG. 26. The number of delay stages is defined by an output of the decoder 724 which receives the signal P1-SKEW-BC~P1-SKEW-B2 supplied from the control unit 106 through the lines 6045-6047. The decoder 724 selects only one of the lines 7221-7228 in accordance with the input signal and activates the selected line. As a result, a corresponding gate of a multiplexer in the variable stage shift register 721 is opened and the data in the corresponding stage is selected and outputted. The shift register 721 is operated by the timing signals $\phi_1$ and $\phi_2$ (on the lines 6411 and 6422, respectively) from the control unit 106. At the fall of the signal $\phi_1$, the data on the lines 8057-8064 is read in, and at the rise of the signal $\phi_2$, the data on the lines 7201-7208 is outputted. The data outputted on the lines 7201-7208 is supplied to the data unit 101.

A register (R) 723 reads in the data outputted on the lines 8057-8064 at the rise of the signal $\phi_1$ and outputs the data to the signal lines 7211-7218 at the fall of the signal $\phi_2$. The data on the lines 7211-7218 is supplied to the processor unit 103.

By the gate control of the tri-state buffer 723 which is operated by the bus direction signal applied to the terminal BD, the input/output buffer 108 can be used as either the input buffer or the output buffer. Since the shift register 721 can set any data supply timing to the data unit 103 by the shift register 711 in the input buffer 107, various data combinations are allowed and various image processing operations are permitted.

ⓒ Input Buffer 109 (Port P3)

The detail of the input buffer 109 is shown in FIG. 16. Numeral 731 denotes a 16-bit register (LKR) which is operated by the timing signal from the control unit 106. In the set-up mode, it is operated by the signals $\tau_1$ and $\tau_2$ (on the lines 6421 and 6422), and in the operation execution mode, it is operated by the signals $\phi_1$ and $\phi_2$ (on the lines 6411 and 6412). In the set-up mode, the data on the signal lines 8017-8032 is read into the register 731 at the fall of the signal $\tau_1$ and the data is outputted on the lines 7301-7316 at the rise of the signal $\tau_2$. In the operation execution mode, the data on the lines 8017-8032 is read into the register 731 at the fall of the signal $\phi_1$, and the data is outputted on the lines 7301-7316 at the rise of the signal $\phi_2$. The data outputted on the lines 7301-7316 is supplied to the processor unit 103, the linkage unit 104, the evaluation unit 105, the control unit 106, the memory unit 107 and the output buffer 110 (port P4). The supply of the data to a particular unit is determined by a command from the control unit 106.

ⓓ Output Buffer 110 (Port P4)

The detail of the output buffer 110 is shown in FIG. 17. Numeral 741 denotes a selector (SEL) which is a 12-$\tau Z_0$-1 selector to output a 16-bit data out of 12×16-bit input data. The particular data to be selected by the selector 741 is determined by the data on the bus (17 lines: 6351-6352, 6354-6358, 6361-6365, 6221-6222, 6225 and 6227-6228). This data is supplied from the control unit 106. Numeral 742 denotes an output buffer which receives the data on the line 5301 (1-bit data from the evaluation unit 105) and outputs the data at the terminal BNR through the line 8050. A relationship between the output signal lines which are selectively outputted on the output signal lines 8033-8040 and 8042-8049 by the selector 741, and the select signal lines from the control unit 106 is shown in Table 5.

TABLE 5

| "High" level select signal line | | Input signal lines selected to output signal lines 8033-8040, 8042-8049 |
|---|---|---|
| P4-ADR0 | 6221 | 7301-7316 |
| P4-ADR1 | 6222 | 4161-4176 |
| P4-ADR4 | 6225 | 4221-4236 |
| P4-ADR6 | 6227 | *5021-5036 |
| P4-ADR7 | 6228 | *5041-5056 |
| REG-ADR0 | 6351 | 7301-7316 |
| REG-ADR1 | 6352 | 4161-4176 |
| REG-ADR3 | 6354 | 5001-5016 |
| REG-ADR4 | 6355 | 4221-4236 |
| REG-ADR5 | 6356 | 5061-5076 |
| REG-ADR6 | 6357 | 5021-5036 |
| REG-ADR7 | 6358 | 5041-5056 |
| REG-ADRA | 6361 | **6101-6107 |
| REG-ADRB | 6362 | 6001-6016 |
| REG-ADRC | 6363 | 6021-6036 |
| REG-ADRD | 6364 | 6041-6056 |
| REG-ADRE | 6365 | 6061-6076 |

In Table 5, a symbol * indicates that the data on the signal lines 5061-5076 is selected when the signal SYNC-ENABLE (on the line 6074) from the control unit 106 and the signal MASK-MODE (on the line 6075) are both a "High" level and one of the signal EU-SYNC-B0 (on the line 6551) and the signal EU-SYNC-B1 (on the line 6552) is a "Low" level. The data on the signal lines 6101-6107 marked with  is outputted on the signal lines 8033-8039 and the "Low" level signal is outputted on the signal lines 8040, 8042-8049**.

ⓔ Data Unit (DU) 101

The detail of the data unit 101 in shown in FIG. 18. As seen therefrom, the data unit 101 comprises register blocks (RB0-RB3) 121-124 and a decoder 125. The register blocks are constructed identically and details thereof are shown by the register blocks 121 and 122, in which numerals 131 and 141 denote 9-bit variable stage shift registers (VSR-B) which can change the number of delay steps between 1-4, numerals 132 and 142 denote 8-bit registers, and numerals 133-135 and 143-145 denote selectors each of which selects one out of two inputs.

The data unit 101 functions to sequentially shift the image data supplied from the port P1 and output it to the port P2 and a function to parallelly transfer the image data registered in a plurality of (four in the present embodiment) register blocks to the processor unit 103. It also has a function to sequentilly shift the image data supplied from the port P2 and parallelly transfer the image data registered in the four register blocks to the processor unit 103.

The register blocks each have the same function and construction, and the register block 121 is primarily explained below. The image data from the port P1 is outputted on the lines 7101-7109 and supplied to the variable stage shift register 131 through the selector 133 and the lines 1141-1149, when the selector 133 has selected the image data supplied from the port P1. The selector 133 is controlled by the signal DU-SEL-A supplied from the control unit 106 through the line 6512. When the signal is a "High" level, the data on the lines 1101-1109 (output of the shift register 131) is selected, and when it is a "Low" level, the data on the lines 7101-7109 (image data from the port P1) is selected. The output of the selector 133 is sent to the shift register 131 and the selector 135. The output of the shift register 131 is transferred to the selector 133 and the selector 143 of the register block 122. The variable stage shift register 141 of the register block 122 outputs the data to the next register block 123 through the lines 1201–1209. Similarly, the register block 123 outputs the data to the register block 124 through the lines 1301–1309, and the register block 124 outputs the data to the port P2 through the lines 1401–1409. The writing (read-in) and read-out of the data are performed in synchronism with the signals $\phi_1$ and $\phi_2$. At the fall of the signal $\phi_1$, the data is written, and at the rise of the signal $\phi_2$, the data is read out. Thus, the data is sequentially shifted. The selector 135 is controlled by the signal outputted on the signal line 1149 and the signals DU-ENA-b and DU-FUNC-b outputted on the signal lines 6054 and 6055 from the control unit 106. When the signal DU-ENA-b is "1", the signal DU-FUNC-b is "0" and the signal on the signal line 1149 is "0", "0's" are selected on the signal lines 1121–1128. Thus, no data is supplied to the processor unit 103. When the above three signals assume other states, the data outputted on the signal lines 1141–1148 is selected. The data on the lines 1141–1148 correspond to the input data to the terminals $A_0$–$A_7$ and the line 1149 corresponds to the terminal $A_b$. The data transferred from the input/output buffer 108 (port P2) through the lines 7201–7208 is supplied to the register 132 and the selector (SEL-B) 134 in the register block 121. The data supplied to the register 132 is supplied to the register 142 and the selector 144 in the register block 122. The data in the register 142 is supplied to the next register block 123, then to the register block 124. The data is sequentially transferred in accordance with this timing. The data is written into the register 132 in synchronism with the fall of the signal $\phi_1$ and the data is read out (transferred) in synchronism with the rise of the signal $\phi_2$. The data supplied to the selector 134 is outputted to the processor unit 103 through the selector 134, which is controlled by the signal DU-SEL-B outputted on the signal line 6053 by the control unit 106. The output of the selector 134 appears on the signal lines 1131–1138 and is transferred to the processor unit 103 with the output of the selector 135. For the selector 134, since the two input data are the same, the "High" level and the "Low" level of the signal DU-SEL-B make no difference. However, in the corresponding registers in the other register blocks 122–124, they make sense. For example, in the selector 144 in the register block 122, the data on the lines 7201–7208 is selected when the signal DU-SEL-B on the line 6052 is "High" level and outputted on the lines 1131–1138 and when it is a "Low" level, the data on the lines 1111–118 is selected and outputted on the lines 1231–1238. When the signal on the line 6052 is a "High" level, the same 8-bit data appears on the signal lines 1131–1138, 1231–1238, 1331–1338 and 1431–1438 and when the signal is a "Low" level the data from the immediately preceeding register block (for example, for the register block 122, the output data of the register 132 in the register block 121) appears on the signal lines 1131–1138, 1231–1238, 1331–1338 and 1431–1438.

In this manner, two bytes are supplied to the processor unit 103 from the register blocks 121–124. The variable stage shift registers 131 and 141 and the registers 132 and 142 in the respective blocks are operated by the timing signals $\phi_1$ and $\phi_2$, and the data is parallelly outputted to the processor unit 103 from the register blocks.

Advantages of the embodiment are explained with reference to the register block 121.

Since the number of delay steps of the shift register 131 is variable between 1–4 steps, the image processing in either a raster scan input mode or a stick scan input mode (to be described later) is allowed. A feedback mechanism comprising the shift register 131, the signal lines 1101–1109, the selector 133 and the signal lines 1141–1149 can send a data string of up to four words (with one word consisting of 9 bits) to the processor unit 103 continuously two or more times. Thus, a single mask processing and a multi-mask processing (to be described later) can be attained. By the combination of the register 132 and the selector 134, various data combinations are allowed and various image processing operations are allowed. On the other hand, only a portion of the input image data can be cancelled by the selector so that only the desired imaged data can be processed.

The decoder 125 decodes the signal DU-STEP-RO-1 on the signal lines 6049–6050 from the control unit 106 and supplies it to the shift registers 131 and 141 in the register blocks 121–124.

(f) Memory Unit (MU) 102

The detail of the memory unit 102 is shown in FIG. 19. The memory unit 102 shown in FIG. 19 comprises four memory blocks (MB0–MB3) 201–204, a selector 205 and a decoder 206 which decodes the output of the selector 205. The memory blocks are constructed identically, and the memory block 201 is primarily explained below. The memory unit has a function to store the data and a function to output the stored data to the processor unit 103 by a read command.

The memory block 201 comprises 16 words×8 bits or 128 bits memory cells which in a random access memory (RAM) of 8-bit parallel write and 16-bit parallel read.

The writing to the memory block 201 is accomplished in the set-up mode in the following manner. Signals REGWEN and REGADR 8 outputted on the signal lines 6513 and 6359 from the control unit 106 are set to a "High" level. The signal on the write enable signal line 7309 from the input buffer 109 in the port P3 is set to a "High" level and the timing signal $\tau_1$ outputted on the signal line 6421 from the control unit 106 is changed from "Low"→"High"→"Low" so that the data outputted on the lines 7301–7308 from the input buffer 109 is written. The data is written at the address designated by the decoded data outputted on the lines 2011–2026. The decoder 206 recieves the 4-bit data on the lines 2001–2004 and outputs a decoded result. In the writing, the signal outputted on the line 6431 from the control unit is such that the selector 205 selects the address from the port P3. In the present embodiment, when the signal is a "Low" level, the selector 205 selects the address data outputted on the lines 7313–7316, and when the signal is a "High" level, the selector 205 selects the address data on the lines 6321–6324. Thus, the data (on the lines 7301–7308) supplied to the memory unit from the third port P3 is stored at the address designated by the simulataneously inputted address data (on the lines 7313–7316).

On the other hand, the contents of the memory block 201 (and other blocks) are always outputted on the output data lines (A, B) 2101–2108 and 2111–2118. Assuming that an address X of the address lines 2011–2026 is a "High" level, the content of the 8 bits stored at the address X of the memory block 201 is read out to the lines 2111–2118, and the content at the address (X+8) and 16 is read out to the lines 2101–2108. The same is true for other memory blocks. The read-out data are supplied to the processor unit 103.

The address lines 2011–2026 of the memory block are output signal lines of the decoder 206, which are an encoded version of the signal lines 2001–2004. Only one of the lines 2011–2026 is always a "High" level. The signal lines 2001–2004 are output signal lines from the selector 205 and execute the selection by the signal EXEC (on the line 6431) from the control unit. The selector 205 selects MU-ADR0~MU-ADR3 (on the lines 6321–6324) when the line 6431 is a "High" level and selects the address (on the lines 7313–7316) from the input buffer 109 (port P3) when the line 6431 is a "Low" level, and outputs the selected data on the lines 2001–2004. In the set-up mode (EXEC="Low") the data is written at the address designated by the signal from the input buffer, and in the operation execution mode (EXEC="High"), the data is read out from the address designated by the signal from the control unit 106.

In FIG. 19, the lines 7309–7312 supply the write enable signal to the memory blocks. Accordingly, when the write enable signal is applied to all of the lines 7309–7312, the same data can be simultaneously written at the addresses X of the respective memory blocks. It is also possible to write different data at the addresses X of the respective memory blocks, because the write enable signals of the respective memory blocks are independent.

The signal lines 7301–7316 from the input buffer 109 are summarized as follows.

TABLE 7

| Signal Line | Function |
|---|---|
| 7301 | |
| 7302 | |
| 7303 | |
| 7304 | Write Data |
| 7305 | |
| 7306 | |
| 7307 | |
| 7308 | (MSB) |
| 7309 | MB0 ⎫ |
| 7310 | MB1 ⎪ |
| 7311 | MB2 ⎬ Write Enable Signal |
| 7312 | MB3 ⎭ |
| 7313 | |
| 7314 | Write Address |
| 7315 | |
| 7316 | |

(g) Processor Unit (PU) 103

The detail of the processor unit 103 is shown in FIG. 20. The unit 103 is heart of the image processing operation in the image signal processor. As shown in FIG. 20, the unit 103 comprises a plurality of (four in the present embodiment) processor elements (PE0–PE3) 301–304 and two decoders 305 and 306 for decoding signals from the control unit. Sixteen lines from the data unit 101, sixteen lines from the memory unit 102 and eight lines from the input buffer 107 (port P1), the input/output buffer 108 (port P2) or the input buffer 109 (port P3) are connected to each of the processor elements 301–304, and data are supplied through total of forty signal lines. Each processor element outputs a 16-bit operation result to the linkage unit 104. The signals from the control unit 106, except the signal lines 6061–6068, are commonly supplied to the processor elements 301–304 directly or after decoding. The processor elements 301–304 are constructed identically, and the processor element 301 is primarily explained below.

The processor element 301 comprises on 8-bit parallel AND circuit 311 which performs AND operation bit by bit, an arithmetic logic unit (ALU-A) 312 which performs addition and subtraction, an arithmetic logic unit (ALU-B) 313 which performs multiplication, three 8-bit selectors (SEL-A, SEL-B, SEL-C) 321–323, four 8-bit registers (R1–R4) 324–327 and a 16-bit register (R5) 328.

When the signal PU-SEL-A (line 6032) is a "High" level, the selector (SEL-A) 321 selects the data on the signal lines 2101–2108 from the memory block 210 in the memory unit 102, and when the signal is a "Low" level, it selects the data on the signal lines 3101–3108, that is, all-"1"'s data onto the signal lines 3111–3118, and supplies the selected data to the AND circuit 311.

The selector (SEL-B) 322 selects the data on the signal lines 2111–2118 from the memory block 201 in the memory unit 102 when the signal line PU-SEL-B (line 6033) from the control unit 106 is a "High" level, and selects the data on the signals lines 1131–1138 from the register block 121 in the data unit 101 onto the signal lines 3141–3148 when the signal is a "Low" level, and supplies the selected data to the register (R2) 325.

The selector (SEL-C) 323 selects the data on the signal lines 7309–7316 from the input buffer 109 when the signal line PU-SEL-C (line 6034) from the control unit 106 is a "High" level and selects the data on the signal lines 3121–3128 from the AND circuit 311 when the signal is a "Low" level, and supplies the selected data to the register (R1) 324.

The arithmetic logic unit (ALU-A) 312 receives the contents of the registers (R1, R2) 324 and 235 as input data and outputs operation results to the registers (R3, R4) 326 and 327. The function of the ALU-A 312 is selected by the signals PU-FUNC-A0~PU-FUNC-A2 (lines 6001–6003) from the control unit. The functions and the contents of the signal lines 6001–6003 and the ALU-A 312 are shown in Table 8.

TABLE 8

| PU-FUNC-A | | | Func- | |
|---|---|---|---|---|
| 2(6003) | 1(6002) | 0(6001) | tion | CONTENT |
| 0 | 0 | 0 | NOP | R3←(R1) R4←(R2) |
| 0 | 1 | 0 | ADD | R3 ⎫ ←(R1)+(R2) R4 ⎭ |
| 0 | 1 | 1 | SUB | R3 ⎫ ←(R1)−(R2) R4 ⎭ |
| 1 | 0 | 0 | AND | R3←(R1)∧(R2) |
| 1 | 0 | 1 | OR | R3←(R1)∨(R2) |
| 1 | 1 | 0 | EOR | R3←(R1)⊕(R2) |
| 1 | 1 | 1 | ENOR | R3←(R1)⊙(R2) |

(Note 1) In NOP, both (R1) and (R2) may be either a two's complement representation or an absolute value representation and (R1) and (R2) are transferred to R3 and R4, respectively, only when the ALU-B is in a MULT function mode, and the absolute value representation in (R2) is converted to two's complement representation, which is transferred to R4. If $(R2) \geq 2^8$, $2^8 - 1$ is outputted to R4.

(Note 2) In ADD and SUB, both (R1) and (R2) may be either two's complement representation or an absolute representation but an operation result is always outputted in two's complement representation.

In actuality, the data on the signal lines 6001–6003 from the control unit is decoded by the decoder 305 in the processor unit 103, and the decoded signal is supplied to the ALU's-A of the respective processors through the signal lines 3531–3538.

The arithmetic logic unit (ALU-B) 313 receives the contents of the registers (R3, R4) 326 and 327 and outputs an operation result to the register (R5) 328. The function of the ALU-B 313 is selected by the signals PU-FUNC-B0~PU-FUNC-B2 (lines 6004–6006) from the control unit 106. The functions and the contents of the signal lines 6004–6006 and the ALU-B 313 are shown in Table 9.

TABLE 9

| PU-FUNC-B | | | Func- | |
|---|---|---|---|---|
| 2(6006) | 1(6005) | 0(6004) | tion | Content |
| 0 | 0 | 0 | NOP-A | R5←(R3) |
| 0 | 0 | 1 | NOP-B | R5←(R4) |
| 0 | 1 | 0 | ABS | R5←\|R3\| |
| 0 | 1 | 1 | NEG | R5←(R3) |
| 1 | 0 | 0 | MAX | R5←max (R3, R4) |
| 1 | 0 | 1 | MIN | R5←min (R3, R4) |
| 1 | 1 | 0 | CNT | R5← number of 1's in (R3) |
| 1 | 1 | 1 | MULT | R5←(R3)*(R4) |

(Note 1) The operation result is always in 16-bit two's complement representattion and outputted to R5.

(Note 2) In an ADD or SUB function in the ALU-A, even if an overflow or an underflow occurs, an error can be absorbed in the ALU-B. For the MULT function, however, $2^{15}-1$ is outputted to R5 as an approximation.

In actuality, the data on the signal lines 6004–6006 from the control unit 106 is decoded by the decoder in the processor unit 103, and the decoded signal is supplied to the ALU's-B in the respective processor elements through the signal lines 3541–3548.

The ALU-A 312 and the ALU-B 313 are permitted to represent data in the absolute value representation and the two's complement representation. The type of the representation of the data is designated by the signals PU-TYPE-A and PU-TYPE-B on the lines 6030 and 6031 from the control unit 106. The output (data on the line 3131–3138) of the selector (SEL-C) 323 is in the absolute value representation when the signal on the line 6030 is a "High" level, and in the two's complement representation when the signal is a "Low" level. Similarly, the output (data on the lines 3141–3148) of the selector (SEL-B) 322 is in the absolute value representation when the signal on the line 6031 is a "High" level, and in the two's complement representation when the signal is a "Low" level. When the binary image data is processed, the levels of the signals on the lines 6030 and 6031 are not significant. The outputs of the ALU-A 312 and the ALU-B 313 are always in the two's complement representation.

In the ALU-A 312, if an overflow or an underflow occurs in the execution of addition or subtraction (that is, if an operation result exceeds a range of an 8-bit two's complement representation), an overflow signal line (CU-OVF-A) 3511 or an underflow signal line (CU-UDF-A) 3521 assumes a "High" level. When the output of the selector (SEL-B) 322 is in the absolute value representation and the ALU-B 313 is in the MULT function (multiplication) and if the data on the lines 3141–3148 exceeds $2^8-1$, $(2^8-1)$ is outputted to the register (R4) 327 and a signal CU-OVS-B0 on an over-scale signal line 3501 assumes a "High" level. The data on the signa lines 3501, 3511 and 3521 are supplied to the control unit 106. When the overflow or the overscale occurs, $(2^7-1)$ is outputted, and when the underflow occurs, $-2^7$ is outputted.

The signals PU-PEO-00~PU-PEO-01 are supplied to ALU-B 313 from the control unit 106 through the lines 6061–6062. The output of the ALU-B is controlled by those signals as shown in Table 10.

TABLE 10

| PU-PE0-0 | | ALU-B313 |
|---|---|---|
| 1(6062) | 0(6061) | Output |
| 0 | 0 | Operation result |
| 0 | 1 | 0 |
| 1 | 0 | $2^{15}-1$ |
| 1 | 1 | $-2^{15}$ |

In this manner, the processor element at any location can be operated.

The ALU-B 313 is controlled by the signal PU-FUNC-B3 supplied from the control unit 106 through the line 6007 in a manner shown in Table 11.

TABLE 11

| PU-FUNC-B3 (6007) | Content |
|---|---|
| 0 | ALU-B functions in accordance with PU-FUNC-B0~PU-FUNC-B2 (lines 6004–6006) |
| 1 | Following output irrespective of PU-FUNC-B0~PU-FUNC-B2 (6004–6006) $\begin{pmatrix} 3151\text{-}3158 \rightarrow 3179\text{-}3186 \\ 3161\text{-}2168 \rightarrow 3171\text{-}3178 \end{pmatrix}$ |

Thus, by the combination with other control functions, data can be set on the lines 3171–3186.

(h) Linkage Unit (LU) 104

The detal of the linkage unit 104 is shown in FIG. 21. The linkage unit 104 comprises six 16-bit arithmetic units (AU-C0, AU-C1, AU-C2, AU-D, AU-E, AU-F) 401–406, three 16-bit 2-to-1 selectros (SEL-A, SEL-B, SEL-C), 411–413, seven 16-bit registers (R6-R10, RRA, RRB) 421–427 and two 2-to-4 decoders 431–432.

The operation result of the processor unit 103 is transferred to the linkage unit 104 through the lines 3171–3186, 3271–3286, 3371–3386 and 3471–3486. The operation result data from the PE0 and the PE1 are supplied to the AU-C0 401 where they are consolidated and the consolidated data is supplied to the AU-C2 403 through the register 421 and the lines 4001–4016. The operation result data from the PE2 and the PE3 are supplied to the AU-C1 402 where they are consolidated and the consolidated data is supplied to the AU-C2 403 through the register 422 and the lines 4021–4036. The AU-C2 consolidates the input data and supplies the consolidated data to the AU-D 404 through the register 423 and the lines 4041–4056. The functions of operations in 401–403 are designated by the signals LU-FUNC-C0~LU-FUNC-C1 on the lines 6008–6009 from the control unit 106. These signals are decoded by the decoder 431 and the decoded signal is supplied to the units 401–403 through the lines 4301–4304. The functions and the contents of these signals and the units 401–403 are shown in Table 12.

TABLE 12

| LU-FUNC-C | | Func- | |
|---|---|---|---|
| 1 (6009) | 0 (6008) | tion | Content |
| 0 | 0 | ADD | R8 ← PE0 + PE1 + PE2 + PE3 |
| 0 | 1 | SUB | R8 ← ( PE0 − PE1 − ( PE2 − PE3 ) |
| | | | ∴ R8 ← PE0 − PE1 − PE2 + PE3 |
| 1 | 0 | MAX | R8 ← max ( PE0 , PE1 , PE2 , PE3 ) |
| 1 | 1 | MIN | R8 ← min ( PE0 , PE1 , PE2 , PE3 ) |

(Note) PE0 indicates the operation output of PE0.

In the AU-C0~AU-C2 401–403, if an overflow or an underflow occurs, the overflow signal line (CU-OVF-C) 4401 or the underflow signal line (CU-UDF-C) 4402 assumes a "High" level. This signal is supplied to the control unit. For the overflow, $(2^{15}-1)$ is outputted, and for the underflow, $-2^{15}$ is outputted.

The operation result of the AU-C2 403 is transferred to the AU-D 404. The AU-D 404 functions in accordance with the signals LU-FUNC-D0~LU-FUNC-D4 on the signal lines 6010–6014 from the control unit, as shown in Table 13.

TABLE 13

| LU-FUNC-D | | Func- | |
|---|---|---|---|
| 4(6014) | 3(6013) | tion | Content |
| 0 | 0 | NOP | R9←(R8) |
| 0 | 1 | DIV | R9←the quotient of $(R8)/2^n$ |
| 1 | 0 | ABS | R9←|R8| |
| 1 | 1 | AAD | R9← the quotient of $|R8|/2^n$ |

(Note 1) n( 1, 2, ..., 8) is determined by the following equation.

$$n=[6012]\times 2^2+[6011]\times 2+[6010]+1$$

where [60XX] is data ("1" or "0") on the signal line 60XX. (LU-FUNC-D2~LU-FUNC-D0).

(Note 2) AAD means ABS and DIV.

The output of the AU-D 404 is supplied to the AU-E 405 through the register (R9) 424, the register (R10) 424 and the selectors (SEL-A, SEL-B) 411 and 412. The following operations can be carried out by means of the register (R10) 425 and the selectors 411 and 412.

① Operation for the data (on the signal lines 7301–7316) from the input buffer 109 and the data in the register (R10) 425.

② Operation for the data from the input buffer 109 and the data in the register (RRA) 426.

③ Operation for the data in the register (R9) 424 and the data in the register (R10) 425.

④ Operation for the data in the register (R9) 424 and the data in the register (RRA) 426.

From the above, by using a plurality of LSI's 100, the image processing in two input modes, a raster scan input mode and a stick scan input mode (to be described later) is allowed. The four data selections described above are controlled by the signal lines 6074, 6075, 6521 and 6522 from the control unit. The signal SYNC-ENABLE on the signal line 6074 indicates active/non-active states of the signals LU-SYNC0~LU-SYNC1 on the signal lines 6521 and 6522, and the signal INPUT-MODE on the signal line 6075 indicates an input mode. The signal lines 6521 and 6522 are active when the signal line 6074 is a "High" level and non-active when it is a "Low" level. When the signal line 6075 is a "High" level, the stick scan input mode is selected, and when it is a "Low" level, the raster scan input mode is selected. A relationship between the signal lines 6074, 6075, 6521 and 6522 and the selection of the selectors (SEL-A, SEL-B) 411 and 412 is shown in Table 14.

TABLE 14

| INPUT-MODE (6075) | SYNC-ENABLE (6074) | LU-SYNC1 (6522) | LU-SYNC0 (6521) | Selection | |
|---|---|---|---|---|---|
| | | | | SEL-A (411) | SEL-B (412) |
| 0 | 0 | — | — | Port 3 | R10 |
| 0 | 1 | — | — | | |
| 1 | 0 | — | — | | |
| 1 | 1 | 0 | 0 | R9 | RRA |
| | | 0 | 1 | Port 3 | |
| | | 1 | 0 | R9 | R10 |
| | | 1 | 1 | | |

When the third port P3 is selected, the data supplied to the AU-E 405 is controlled by the signals LU-VAL-I0~LU-VAL-I1 on the lines 6069 and 6070 from the control unit, as shown in Table 15.

TABLE 15

| LU-VAL-I | | SEL-A (411) |
|---|---|---|
| 1(6070) | 0(6069) | Output |
| 0 | 0 | Port 3 |
| 0 | 1 | 0 |
| 1 | 0 | $2^{15}-1$ |
| 1 | 1 | $-2^{15}$ |

The function of the AU-E 405 is selected by the signals LU-FUNC-E0~LU-FUNC-E1 on the lines 6015–6016 from the control unit 106. These signals are decoded by the decoder 432 and the decoded signal is supplied to the AU-E 405 through the lines 4311–4314. The functions and the contents of those signals and the AU-E 405 are shown in Table 16.

TABLE 16

| LU-FUNC-E | | Func- | |
|---|---|---|---|
| 1(6016) | 0(6015) | tion | Content |
| 0 | 0 | ADD | RRA← Ⓐ + Ⓑ |
| 0 | 1 | SUB | RRA← Ⓐ − Ⓑ |
| 1 | 0 | MAX | RRA←max ( Ⓐ , Ⓑ ) |
| 1 | 1 | MIN | RRA←min ( Ⓐ , Ⓑ ) |

(Note 1) RRA means result register A.

(Note 2) Ⓐ and Ⓑ indicate outputs of SEL-A and SEL-B, respectively.

In the AU-E 405, if an overflow or an underflow occurs, the overflow signal CU-OVE-E or the underflow signal CU-UDF-E (on the line 4403 or 4404) assumes a "High" level. This signal is supplied to the control unit. The operation results of the AU-E 405 is supplied to the selector (SEL-C) 413 through the register (RRA) 426 and outputted to the output buffer 110.

The selector 413 selects the data from the input buffer 109 or the data in the register 426 and transfers it to the AU-F 406. The selection is made by the signal LU-SEL-C on the line 6035 from the control unit. When the signal on the line 6035 is "High" level, the data from the input buffer 109 is selected, and when the signal is "Low" level, the data in the register 426 is selected.

The AU-F 406 has the same function as the AU-D 404 and it is controlled by the signals LU-FUNC-F0~LU-FUNC-F4 supplied from the control unit 106 through the lines 6021–6025. The functions and the contents of the signals and the AU-F 406 are shown in Table 17.

TABLE 17

| LU-FUNC-F 4(6025) | LU-FUNC-F 3(6024) | Function | Content |
|---|---|---|---|
| 0 | 0 | NOP | RRB←Ⓛ |
| 0 | 1 | DIV | RRB←the quotient of Ⓛ/$2^n$ |
| 1 | 0 | ABS | RRB←\|Ⓛ\| |
| 1 | 1 | AAD | RRB←the quotient of \|Ⓛ\|/$2^n$ |

(Note 1) n=[6023]×$2^2$+[6022]×2+[6021]+1 where [60XX] indicates data on signal line 60XX. (LU-FUNC-F2~LU-FUNC-F0).
(Note 2) RRB means result register B.
(Note 3) Ⓛ means input from LPU.

The output of the AU-F 406 is outputted to the evaluation unit 105 through the register (RRB) 427 and the lines 4221–4236 and also outputted to the output buffer 110.

Ⓙ Evaluation Unit 105

The detail of the evaluation unit is shown in FIG. 22. The evaluation unit (EU) 105 comprises two 16-bit comparators (COMP-A, COMP-B) 501 and 502, a 4-bit binary counter (CNT) 503, four 16-bit 2-to-1 selectors (SEL-A, SEL-B, SEL-C, SEL-D) 511–514, three 16-bit registers (INX, MAXR, MINR) 521–523, two 5-bit registers (TPR, CLR) 524 and 525 and a 1-bit register (BIR) 526.

The comparator (COMP-A) 501 compares the data on the signal lines 4221–4236 from the LU 104 with the data on the signal lines 5141–5156 from the selector (SEL-C) 513 and outputs the larger data onto the signal lines 5181–5196 when the data on the signal lines 4221–4236 is larger than the data on the signal lines 5141–5156, the signal line 5311 assumes a "High" level, and when the former data is equal to or smaller than the latter data, the signal line 5311 assumes a "Low" level.

The comparator (COMP-B) 502 compares the data on the signal lines 4221–4236 from the LU 104 with the data on the signal lines 5161–5176 from the selector (SEL-D) 514 and outputs the smaller data onto the signal lines 5201–5216. When the data on the signal lines 4221–4236 is larger than the data on the signal lines 5161–5176, the signal line 5312 assumes a "Low" level, and when the former data is equal to or larger than the latter data, the signal line 5312 assumes a "High" level.

The selector (SEL-A) 511 and the selector (SEL-B) 512 sends the data on the signal lines 5181–5196 and 5201–5216 onto the signal lines 5101–5116 and 5121–5136, respectively, when the signal EXEC on the line 6431 from the control unit as a "High" level. When the signal EXEC on the line 6431 is a "Low" level, the selectors 511 and 512 sends the data on the signal lines 7301–7316 from the input buffer 109 onto the signal lines 5101–5116 and 5121–5136, respectively.

The selector (SEL-C) 513 and the selector (SEL-D) 514 sends the data on the signal lines 5001–5016 onto the signal lines 5141–5156 and 5161–5176, respectively, when all of the signal SYNC-ENABLE on the line 6074, the signal MASK-MODE on the line 6076, the signal EU-SYNC-B0 on the line 6551 and the signal EU-SYNC-B1 on the line 6552 from the control unit 106 are a "High" level. When at least one of those four signals is a "Low" level, the selectors 513 and 514 sends the data on the signal lines 5021–5036 and 5041–5056 onto the signal lines 5141–5156 and 5161–5176, respectively.

In the set-up mode (the signal line EXEC on the line 6431 is a "Low" level), when both the signal REGWEN on the line 6513 and the signal REG-ADR3 on the line 6354 from the control unit 106 are a "High" level, the data on the signal lines 7301–7316 from the input buffer 109 is written into the initial register 521 at the rise of the signal $\tau_1$ on the line 6421 from the control unit 106. When the signal RESET on the line 6514 from the control unit 106 is a "High" level, the initial register 521 is reset to "0". On the other hand, in the operation execution mode (the signal EXEC on the line 643) is a "High" level, the initial register 521 is not operated and the stored data is continuously outputted onto the signal lines 5001–5016.

In the set-up mode, when both the signal REGWEN on the line 6513 and the signal REG-ADR6 on the line 6357 from the control unit 106 are a "High" level, the MAX register (MAXR) 522 reads in the data on the signal lines 5101–5116 at the fall of the signal $\tau_1$ on the line 6421 from the control unit 106, and outputs the read-in data onto the signal lines 5021–5036 at the rise of the signal $\tau_2$ on the line 6422 from the control unit 106. On the other hand, in the operation execution mode (the signal EXEC is "High" level), the operation of the register 522 is divided into two by the signal SYNC-ENABLE on the line 6074 from the control unit 106. When the signal SYNC-ENABLE is a "Low" level and both the signal EU-FUNC-G3 on the line 6029 and the signal EU-REGWEN on the line 6553 from the control unit 106 are a "High" level, the data on the signal lines 5101–5116 is read in at the fall of the signal $\phi_1$ on the line 6411 from the control unit 106, and the read-in data is outputted onto the signal lines 5021–5036 at the fall of the signal $\phi_2$ on the line 6412. When the signal SYNC-ENABLE is a "High" level and all of the signal EU-SYNC-B1 on the line 6552 from the control unit 106 and the above two signals EU-FUNC-G3 and EU-REGWEN are a "High" level, the operation is same as that when the signal SYNC-ENABLE is a "Low" level.

The register (MINR) 523 operates in the same manner as the register 522. The only difference is that the signal REG-ADR7 on the line 6358 is used in place of the signal REG-ADR6 on the line 6357 from the control unit and the input/output signal lines 5121–5136 and 5041–5056 are used.

In the set-up mode, the registers 522 and 523 are reset to $-2^{15}$ and $2^{15}-1$, respectively, when the signal RESET on the line 6514 from the control unit changes to a "High" level.

The binary register (BIR) 526 comprises a binary processing circuit and a 1-bit register. The binary processing circuit prepares binary data based on the signals on the lines 5311 and 5312 from the comparators (COMP-A, COMP-B) 501 and 502 and the signals EU-FUNC-G0~EU-FUNC-G1 on the lines 6026–6027 from the control unit and supplies the binary data to the 1-bit register. The content of the register is outputted to the output buffer 110 through the signal line 5301.

The function of the binary processing circuit is shown in Table 18.

TABLE 18

| EU-FUNC-G | | | | | |
|---|---|---|---|---|---|
| 1 (6027) | 0 (6026) | (5311) | (5312) | Output | Content |
| 0 | 0 | 0 | 0 | 0 | "1" if (4221-4236)>(5141-5156) |
|   |   | 0 | 1 | 0 | (otherwise "0") |
|   |   | 1 | 0 | 1 |   |
|   |   | 1 | 1 | dc |   |
| 0 | 1 | 0 | 0 | 0 | "1" if (4221-4236)≦(5161-5176) |
|   |   | 0 | 1 | 1 | (otherwise "0") |
|   |   | 1 | 0 | 0 |   |
|   |   | 1 | 1 | dc |   |
| 1 | 0 | 0 | 0 | 0 | "1" if (4221-4236) >(5141-5156) |
|   |   | 0 | 1 | 1 | or (4221-4236)≦(5161-5176) |
|   |   | 1 | 0 | 1 | (otherwise "0") |
|   |   | 1 | 1 | dc |   |
| 1 | 1 | 0 | 0 | 1 | "1"if (4221-4236)≦(5141-5156) |
|   |   | 0 | 1 | 0 | and (4221-4236)>(5161-5176) |
|   |   | 1 | 0 | 0 | (otherwise "0") |
|   |   | 1 | 1 | dc |   |

(Note) dc: don't care condition.

(The signal lines 5311 and 5312 do not simultaneously assume "1").

("1": "High" level, "0": "Low" level).

In the set-up mode (the signal EXEC on the line 6431 is "Low" level), the binary counter (CNT) 503 is reset to "0" at the rise of the signal $\tau_1$ on the line 6421 when the signal RESET on the line 6514 from the control unit is "High" level. In the operation execution mode (the signal EXEC is "High" level), the binary counter 503 is reset to "0" at the rise of the signal $\phi_1$ on the line 6411 when all of the four signals SYNC-ENABLE on the line 6074, MASK-MODE on the line 6076, EU-SYNC-A0 on the line 6541 and EU-SYNC-A1 on the line 6542 are a "High" level. In the operation execution mode, when the signals SYNC-ENABLE, MASK-MODE and EU-SYNC-A1 from the control unit are a "High" level and the signal EU-SYNC-A0 is a "Low" level, the binary counter (CNT) 503 is incremented at the fall of the signal $\phi_1$, and the incremented count is outputted onto the signal lines 5221-5224 at the rise of the signal $\phi_2$.

In the operation execution mode, ① when all of the five signals EU-FUNC-G2 on the line 6028, SYNC-ENABLE on the line 6074, MASK-MODE on the line 6076, EU-SYNC-B0 on the line 6551 and EU-SYNC-B1 on the line 6552 are a "High" level and the signal line 5312 from the comparator 502 is a "Low" level, or ② when all of the signals SYNC-ENABLE, MASK-MODE, EU-SYNC-B0 and EU-SYNC-B1 are a "High" level and both the signal EU-FUNC-G2 and the signal line 5311 from the comparator 501 are a "Low" level, five bits of the temporary register (TPR) 524 are set to a "High" level at the fall of the signal $\phi_1$ on the line 6411, and the set data is outputted onto the signal lines 5231-5235 at the rise of the signal $\phi_2$ on the line 6412. In the operation execution mode, ③ when all of the signals EU-FUNC-G2 on the line 6028, SYNC-ENABLE on the line 6074, MASK-MODE on the line 6076 and EU-SYNC-B1 on the line 6552 from the control unit and the signal from the comparator 502 are "High" level, or ④ when the signal EU-FUNC-G2 is "Low" level and all of the signals SYNC-ENABLE, MASK-MODE, EU-SYNC-B1 and the signal from the comparator 501 are "High" level, the most significant bit of the temporary register (TPR) 524 is set to "Low" level and the low order four bits read in the data on the signal lines 5221-5224 at the fall of the signal $\phi_1$, and outputs the 5-bit data onto the signal lines 5231-5235 at the fall of the signal $\phi_2$ on the line 6412.

In the operation execution mode, when all of the signals SYNC-ENABLE on the lines 6074, MASK-MODE on the line 6076, EU-SYNC-B0 on the line 6551 and EU-SYNC-B1 on the line 6552 from the control unit are a "High" level, the cluster register (CLR) 525 reads in the data on the signal lines 5231-5235 at the fall of the signal $\phi_1$, and outputs the read-in data onto the signal lines 5061-5065 at the rise of the signal $\phi_2$. The data on the most significant bit line 5065 of the signal lines 5061-5065 is expanded onto the signal lines 5066-5076, and the data on the signal lines 5061-5076 is transferred to the output buffer 110.

The evaluation unit 105 includes two comparators 501 and 502 which parallelly select a maximum value and a minimum value. Thus, one of four selections is made at a high speed. That is, four types of functions shown in Table 13 are real-time processed. By the combination with the counter 503 and the registers 524 and 525, cluster processing can be made by utilizing the selection of the maximum value or the minimum value.

The MAXR and MINR may hold the initial settings during the execution of the operation or may be updated by the maximum value or the minimum value from the COMP.

In the clustering processing in which a plurality of standard data are used to the pixel data set for one local image (in the processing in which a desired cluster number is generated by the CNT and written into the CLR), the COMP writes the desired cluster number into the CLR under any one of the following conditions.

① Clustering is made with a maximum value of the operation result.

② Clustering is made with a minimum value of the operation result.

In the clustering operation, the INT (initial register) and the RRB are used for the comparison of the first cluster operation result. In both the cases ① and ②, when the value set in the INR is not reached, a cluster number 0 is written into the CLR.

This evaluation unit 105 functions to evaluate in the last stage of the operation. Major functions are fixed binary processing, floating point binary processing, maximum value clustering and minimum value clustering. All circuits in the unit 105 are synchronized by the synchronization signal (CYNCO-1) in the multi-mask mode operation which uses a plurality of standard data for one pixel of data set and in the stick scan input mode operation which processes no less than four pixels of the multi-valued image (no less than 32 pixels of the binary image) in 2-4 machine cycles by one processor 100.

(j) Control Unit (CU) 106

The detail of the control unit 106 is shown in FIG. 23. The CU 106 comprises four control registers (CR0-CR3) 601–604, a logic circuit 607, a status register (STR) 606, a selector 611, a decoder 612, a variable stage register (VSR-M) 621, a decoder 622, a selector 623, a decoder 624, a clock pulse generator (CPG) 631, buffers 632–634, a decoder 635, a variable stage shift register (VSR-S) 641, an R/S flip-flop (F/F) 642, a fast-in fast-out register (FIFO) 643, a decoder 644, a variable stage shift register (VSR-L) 645, a register 646 and AND gates 651–654.

The control registers 601–604 are 16-bit registers which are rewritable only in the set-up mode (when the signal EXEC on the line 6431 is a "Low" level). The written data is held and outputted until a power supply from the terminal VCC is turned off. The four control registers 601–604 determine the configurations and the functions of the units. In the set-up mode, the control registers 601–604 are reset when the signal RESET on the line 6514 is a "High" level, as shown in Table 19.

TABLE 19

| |
|---|
| CR0 ← $0038 |
| CR1 ← $1200 |
| CR2 ← $0000 |
| CR3 ← $0400 |

($ indicates hexadecimal notation)

Signals with mark * in FIG. 23 are generated in the control unit 106 and outputted therefrom.

In the set-up mode, when the address line 6362 is selected, the data (control data) supplied through the port P3 is written into the control register (CR0) 601. The written data is outputted onto the signal lines 6001–6016.

Similarly, when the address line 6363 is selected, the data supplied from the port P3 is written into the control register (CR1) 602. The written data is outputted onto the lines 6021–6036.

Similarly, when the address line 6364 is selected, the data supplied from the port P3 is written into the control register (CR2) 603. The written data is outputted onto the lines 6041–6055.

Similarly, when the address line 6365 is selected, the data supplied from the port P3 is written into the control register (CR3) 604. The written data is outputted onto the lines 6061–6076.

The logic circuit (LOGIC) 607 comprises three 4-way OR circuits which output a logic OR function of the signal lines 3501–3504, a logical OR function of the signal lines 3511–3514 and a logical OR function of the signal lines 3521–3524 onto the signal lines 6091–6093.

The status register (STR) 606 reads in the data on the lines 6091–6093 and 4401–4404 in the operation execution mode (the signal EXEC is a "High" level) at the rise of the signal $\phi_1$ on the line 6411. Once it reads in the "High" level data, it does not return to a "Low" level. In the set-up mode, when both the signal REG-ADRA on the line 6361 and signal REGWEN on the line 6513 are a "High" level, the content of the register 606 is outputted onto the lines 6101–6107 for the "High" period of the signal $\tau_1$ on the line 6421. When the signal $\tau_1$ changes to a "Low" level, all bits of the register 606 are cleared to a "Low" level. In the set-up mode, the status register 606 is cleared to a "Low" level by setting the signal RESET on the line 6514 to a "High" level.

The selector (SEL) 611 is a 3-bit 2-to-1 selector, and in the operation execution mode, it selects outputs the output signals P4-SEL-00~P4-SEL-03 on the lines 6071–6073 from the control register (CR3) 604 onto the lines 6211–6213. In the set-up mode, the data "110" on the lines 6201–6203 is inputted onto the lines 6211–6213.

The data on the lines 6211–6213 is decoded by the decoder (DEC) 612 and the decoded signal is outputted to the output buffer 110 of the port P4. In the set-up mode, all of the output signal lines 6211 (signal P4-ADR0), 6222 (signal P4-ADR1), 6225 (signals P4-ADR4), 6227 (signal P4-ADR6) and 6228 (signal P4-ADR7) of the decoder 612 are a "Low" level.

The 4-bit variable stage shift register (VSR-M) 621 can take any number of delay stages between 1 and 16 by the signals P1-SKEW-A0~P1-SKEW-A3 on the lines 6041–6044 from the control register (CR2) 603. These signals are decoded by the decoder 622 and the decoded signal is supplied to the shift register 621. The USR-M 621 reads in the data at the fall of the signal $\phi_1$, and outputs the data (MU-ADR0~MU-ADR3) onto the signal lines 6321–6324 at the rise of the signal $\phi_2$.

In the set-up mode (the signal EXEC is a "Low" level), the 4-bit 2-to-1 selector (SEL) 623 selects the signal supplied from the terminals MRA0-MRA3, on the lines 8010–8013 onto the lines 6341–6344. The data outputted onto the lines 6341–6344 is decoded by the decoder 624, and the decoded result is outputted onto the lines 6351–6352, 6354–6359 and 6361–6365. In the operation execution mode (the signal EXEC is a "High" level), the selector 623 selects the lines 6331–6334 ("1111") so that the outputs of the decoder 624 are all a "Low" level.

The clock pulse generator (CPG) 631 responds to the clock applied to the terminal CLK to generate control signal, which is outputted onto the lines 6421 and 6422 through the buffer 633 as the timing signals $\tau_1$ and $\tau_2$ in the set-up mode (the signal EXEC is "Low" level). In the operation execution mode (the signal EXEC is a "High" level), the generated signal is outputted onto the lines 6411 and 6412 through the buffer 632 as the timing signals $\phi_1$ and $\phi_2$. As shown in FIG. 24, the signals $\phi_1$ and $\phi_2$ (or $\tau_1$ and $\tau_2$) are two signals with the "High" and $\phi_2$ (or $\tau_1$ and $\tau_2$) are two signals with the "High" level periods thereof beig non-overlapped by the clock signal on the line 8054. The signals on the lines 6401 and 6402 are supplied to the buffers 632 and 633 and controlled by the signal EXEC. The operation in the CPG 631 is shown in FIG. 25. The data flows ①-④ are repeated for each cycle.

The operation select signal from the terminal OPS is supplied to the buffer 634 through the line 8053 and outputted on the line 6431 as the signal EXEC (mode select signal). When the signal EXEC is "Low" level, the image signal processor 100 operates in the set-up mode, and when it is a "High" level, it operates in the operation execution mode.

The variable stage shift register (VSR-S) 641 can take any number of delay stages between 1 and 16. The number of delay stages is determined by the signals P1-SKEW-A0~P1-SKEW-A3 (lines 6041–6044) from the control register (CR3) 604. These signals are decoded by the decoder 647 and the decoded output is supplied to the VSR-S 641. The VSR-S 641 reads in the data supplied from the terminals SYNC0 and SYNC1 to the lines 8014 and 8015 at the fall of the signal $\phi_1$, and outputs them onto the lines 6501 and 6502 at the rise of the signal $\phi_2$.

The number of delay stages (delay time) of the VSR-S 641 is determined by the same signals P1-SKEW-A0~P1-SKEW-A3 as those for the VSR-M 621 and the variable stage shift register (VSR-A) 711 in the input buffer 107. As a result, the input signals to the image signal processor 100 applied to the terminals $A_0$–$A_7$, $A_b$, MRA-MRA3, SYNC0 and SYNC1 are always applied at the same timing.

The RS flip-flop (F/F) 642 is reset when both the signals from the VSR-S 641 are a "High" level, and the line 6511 assumes a "Low" level. When the line 6502 is a "High" level and the line 6511 is a "Low" level, and line "6511" is set to a "High" level. When both the signal SYNC-ENABLE on the line 6074 and the signal MASK-MODE on the line 6076 from the control register (CR3) 604 are a "High" level, the signal on the line 6511 is outputted onto the line 6512 as the signal DU-SEL-A.

When the signal EXEC is a "Low" level, the signal on the line 8051 from the terminal $\overline{WE}$ is outputted onto the line 6513 by the gate 654 as the signal REGWEN. When the signal EXEC is a "High" level, the signal REGWEN is always a "Low" level.

When the signal EXEC is a "Low" level, the signal on the line 8052 from the terminal $\overline{RES}$ is outputted onto the line 6514 by the gate 653 as the signal RESET. When the signal EXEC is a "High" level, the signal RESET is always a "Low" level.

The first in first out (FIFO) 643 is a 7-stage delay circuit. The input signals to the FIFO 643 are three, the output signal of the VSR-S 641, the output signal of the AND circuit 654 on the line 6515. The FIFO 643 reads in the data at the fall of the signal $\phi_1$ and outputs the data onto the lines 6521–6523 at the rise of the signal $\phi_2$. When both the signal DU-ENA-b on the line 6054 and the signal EU-FUNC-b on the line 6055 from the control register (CR2) 603 are a "High" level, the output signal of the AND circuit 654 is of the same level as the signal on the line 7109, but when one of those signals on the lines 6054 and 6055 is a "Low" level, the output signal of the AND circuit 654 is always a "Low" level.

The 3-bit variable state shift register (VSR-L) 645 can take any number of stages betweenn 1 and 4. The number of stages is determined by the signal DU-STEP-R0 on the line 6049 and the signal DU-STEP-R1 on the line 6050. The decoder 644 receives those signals and supplies the decoded result to the VSR-L 645 through the lines 6531–6534. The VSR-L 645 reads in the data at the fall of the signal $\phi_1$ and outputs the data onto the lines 6541–6543 at the rise of the signal $\phi_2$.

The register 646 is a 3-bit register which reads in the data at the fall of the signal $\phi_1$ and outputs the data onto the lines 6551–6553 at the rise of the signal $\phi_2$.

The contents of the FIFO 643, the VSR-L 645 and the register 646 are cleared to a "Low" level when the signal RESET on the line 6514 changes to a "High" level.

Table 20 shows the relationship between the signals and the line numbers in the control unit 106.

TABLE 20

| Number | Signal |
|---|---|
| 6001 | PU-FUNC-A0 |
| 2 | -A1 |
| 3 | -A2 |
| 4 | PU-FUNC-B0 |

TABLE 20-continued

| Number | Signal |
|---|---|
| 5 | -B1 |
| 6 | -B2 |
| 7 | -B3 |
| 8 | LU-FUNC-C0 |
| 9 | -C1 |
| 6010 | LU-FUNC-D0 |
| 1 | -D1 |
| 2 | -D2 |
| 3 | -D3 |
| 4 | -D4 |
| 5 | LU-FUNC-E0 |
| 6 | -E1 |
| 6021 | LU-FUNC-F0 |
| 2 | -F1 |
| 6023 | LU-FUNC-F2 |
| 4 | -F3 |
| 5 | -F4 |
| 6 | EU-FUNC-G0 |
| 7 | -G1 |
| 8 | -G2 |
| 9 | -G3 |
| 6030 | PU-TYPE-A |
| 1 | PU-TYPE-B |
| 2 | PU-SEL-A |
| 3 | PU-SEL-B |
| 4 | PU-SEL-C |
| 5 | LU-SEL-C |
| 6 | — |
| 6041 | P1-SKEW-A0 |
| 2 | -A1 |
| 3 | -A2 |
| 4 | -A3 |
| 5 | P2-SKEW-B0 |
| 6 | -B1 |
| 7 | -B2 |
| 8 | — |
| 9 | DU-STEP-R0 |
| 6050 | -R1 |
| 1 | — |
| 2 | — |
| 3 | DU-SEL-B |
| 4 | DU-ENA-b |
| 6055 | DU-FUNC-b |
| 6 | — |
| 6061 | PU-PE0-O0 |
| 2 | -O1 |
| 3 | PU-PE1-O0 |
| 4 | -O1 |
| 5 | PU-PE2-O0 |
| 6 | -O1 |
| 7 | PU-PE3-O0 |
| 8 | -O1 |
| 9 | LU-VAL-I0 |
| 6070 | LU-VAL-I1 |
| 1 | P4-SEL-O0 |
| 2 | -O1 |
| 3 | -O2 |
| 4 | SYNC-ENABLE |
| 5 | INPUT-MODE |
| 6 | MASK-MODE |
| 6101 | OVS-B |
| 2 | OVF-A |
| 3 | UDF-A |
| 4 | OVF C |
| 5 | UDF-C |
| 6 | OVF-E |
| 7 | UDF-E |
| 6221 | P4-ADR0 (LKR) |
| 2 | -ADR1 (RRA) |
| 3 | — |
| 6224 | — |
| 5 | P4-ADR4 (RRB) |
| 6 | — |
| 7 | P4-ADR6 (MAXR) |
| 8 | -ADR7 (MINR) |
| 6321 | MU-ADR0 |
| 2 | -ADR1 |
| 3 | -ADR2 |
| 4 | -ADR3 |
| 6351 | REG-ADR0 (LKR) |
| 2 | ADR1 (RRA) |

TABLE 20-continued

| Number | Signal |
| --- | --- |
| 3 | — |
| 4 | -ADR3 (INR) |
| 5 | -ADR4 (RRB) |
| 6 | -ADR5 (CLR) |
| 7 | -ADR6 (MAXR) |
| 8 | -ADR7 (MINR) |
| 9 | -ADR8 (RAM) |
| 6360 | |
| 1 | -ADRA (STR) |
| 2 | -ADRB (CR0) |
| 3 | -ADRC (CR1) |
| 4 | -ADRD (CR2) |
| 5 | -ADRE (CR3) |
| 6 | — |
| 6411 | $\phi_1$ |
| 2 | $\phi_2$ |
| 6421 | $\tau_1$ |
| 6422 | $\tau_2$ |
| 6431 | EXEC |
| 6512 | DU-SEL-A |
| 3 | REGWEN |
| 4 | RESET |
| 6521 | LU-SYNC0 |
| 2 | -SYNC1 |
| 6541 | EU-SYNC-A0 |
| 2 | -A1 |
| 6551 | EU-SYNC-B0 |
| 2 | -B1 |
| 3 | EU-REGWEN |

<Method of Using Image Signal Processor>

In order to operate the image signal processor 100 to a process the image, it is necessary to set the operation select signal applied to the terminal OPS to a "High" level. The data necessary for the operation is set up in the set-up mode (the operation select signal is "Low" level.) Depending on the image data input system, the operation execution mode assumes either the raster scan input mode (RSI) or the stick scan input mode (SSI). Each input mode is further divided into the single mask mode (SM) and the multi-mask mode (MM) by the number of masks.

RSI Mode

When the multi-valued image is inputted in the RSI mode, pixels in the input image are scanned line by line from left to right and from top to bottom, as shown in FIG. 27A. For example, when the input image consists of 100 vertical pixels by 100 horizontal pixels, the pixel at the leftend in the first line, that is, at the left-top corner of the input image is first scanned, and the pixel at the right-bottom corner of the input image is scanned last (FIG. 27B). Each pixel is scanned only once.

When the binary image is inputted in the RSI mode, eight vertical pixels by one horizontal pixel, that is, a total of eight pixels are always scanned at a time. As shown in FIG. 28A, the pixels in the lines 1–8 of the input image are first scanned from left to right, and then the pixels in the lines 2–9 are scanned from left to right (FIG. 28B). Finally, the pixels in the eight lines including the last line are scanned from left to right. Thus, except the top and bottom seven lines, each pixel is scanned eight times. In FIG. 27B (and FIG. 29B), a symbol ○ indicates one pixel (data) to be scanned, and a numeral in ○ indicates the order of scan. In FIG. 28 (and FIG. 30), a symbol □ indicates eight pixels which are scanned simultaneously, and a numeral in □ indicates the order of scan.

SSI Mode

In the SSI mode, the image is inputted by 3 stages of scanning. Pixels in a stick consisting of 2, 3 or 4 pixels for the multi-valued image and 16, 24 or 32 pixels for the binary image are vertically scanned. The input image is scanned in the direction of line, stick by stick, and the scan is expanded in the direction of row. This is illustrated in FIGS. 29A and 29B. The number of pixels in the stick for the multi-valued image and (the number of pixels in the stick) 18 for the binary image are defined as a stick length. In the SSI mode, the stick length is 2, 3 or 4. (When the stick length is 1, it is the RSI mode.)

Assuming that the multi-valued image consisting of 100 vertical pixels by 100 horizontal pixels is to be inputted in the SSI mode with the stick length of 3, they are scanned in the order shown in FIG. 29B. In FIG. 29B, ② and ③⓪① are the same pixel and ③, ③⓪② and ⑥⓪① are the same pixel. Except the top and bottom two lines of the input image, each pixel is scanned three times, which is equal to the stick length.

When the binary image consisting of 100 vertical pixels by 100 horizontal pixels is to be inputted in the SSI mode with the stick length of 3, they are scanned as shown in FIG. 30. Except the top and bottom 23 (=8×3−1) pixels of the input image, each pixel is scanned 24 (=8×33 3) times.

SM mode and MM mode

As shown in FIG. 31, in the single mask (SM) mode a partial image segmented from the input image is processed by using only one mask such as convolution weight coefficient or pattern matching template. In the multi-mask (MM) mode, as shown in FIG. 32, a partial image is processed by using a plurality of masks.

In the SM mode, since only one output image is produced, fixed binary processing and maximum/minimum value extraction can be done by using the evaluation unit (EU).

In the fixed processing, the control signal EU-FUNC-G3 on the line 6029 from the control unit (CU) is set to "0" ("Low" level) to fit the MAXR and the MINR. The binary processing condition is set by the control signals EU-FUNC-G0~EU-FUNC-G1 on the lines 6026–6027 from the CU. The condition is shown in Table 21.

TABLE 21

| | (Binarization Condition) | |
| --- | --- | --- |
| EU-FUNC-G | | Content |
| 0 | 0 | If RRB>MAXR then BNR=1 else BNR=0 |
| 0 | 1 | If RRB≦MINR then BNR=1 else BNR=0 |
| 1 | 0 | If RRB>MAXR or RRB≦MINR then BNR=1 else BNR=0 |
| 1 | 1 | If MINR<RRB≦MAXR then BNR=1 else BNR=0 |

In the SM mode, when the maximum value and the minimum value are to be extracted, the signal EU-FUNC-G3 is set to "1" ("High" level). Thus, when the processing for one image has been completed, the maximum value and the minimum value are held in the MAXR and the MINR, respectively (when SR-ENA-b="0" or SR-FUNC-b="0").

In the SM mode, when the maximum value and the minimum value for only a portion of the input image are to be extracted, the control signals SR-ENA-b and SR-FUNC-b of the CU are set to "1" ("High" level) and a binary image having "1" at the portion from which the maximum value and the minimum value are to be extracted and "0" at other area is supplied to the terminal $A_b$ of the data bus A with the input image.

By combining the signals SR-ENA-b and SR-FUNC-b with the signal EU-FUNC-B, a position of a pixel having the maximum/minimum value in the output image can be determined from the BNR.

In the MM mode, the fixed binary processing under the same binary processing condition can be attained but the EU has no function to handle the output image as a unit. The most important function of the EU in the MM mode is the clustering by the counter (CNT). The clustering function is selected by the control signal EU-FUNC-G2 on the line 6028 of the CU. The signal EU-FUNC-G3 on the line 6029 must be "1" ("High" level). (See Table 22)

TABLE 22

| (Clustering) (EU-FUNC-G3 = "1") | |
|---|---|
| EU-FUNC | Content |
| 0 | Maximum Clustering (Classification by maximum value) |
| 1 | Minimum Clustering (Classification by minimum value) |

In the MM mode, operation results (output images) which are equal in number to the number of masks are obtained for the partial images of the input image, but the clustering is done for each local image. For example, in the maximum clustering processing in the MM mode of the number of steps of 4, four operation results are obtained for one partial image and the maximum value thereof and the cluster number (1, 2, 3 or 4) are outputted to the terminals $LO_{0-15}$ in time-division fashion. This operation is carried out for all partial images. Up to 16 masks can be used.

The maximum clustering can be used to calculate the strength and the direction of the edge in the multi-valued image and pattern-match the binary image.

The minimum clustering can be used to pattern-match the multi-valued image and classify color-distances of the color image.

In clustering, the operation result for the partial image and the first mask is always compared with the INR and a larger one is stored in the MAXR while a smaller one is stored in the MINR. The operation results for the second and subsequent masks are compared with the MAXR and the MINR so that the MAXR and the MINR are updated. When the comparison with all operation results for the masks is completed, the maximum value of the operation results including the initial value of the INR is held in the MAXR and the minimum value is held in the MINR. In the maximum clustering, the mask number ("0" if it is the INR) which resulted in the value held in the MAXR is held in the CLR as the cluster number. If it is the first mask, "1" is held, and if it is the second mask, "2" is held. Similarly, in the minimum clustering, the mask number ("0" if it is the INR) which resulted in the value held in the MINR is held in the CLR. The content of the CLR is read out to the terminals $LO_{0-15}$ in time division with the MAXR or the MINR.

Function of Signal SYNC

By the combination of the input mode and the mask mode, the operation execution mode carries out four operations. The operations of the LU and EU significantly differ in those operations. The signal SYNC controls the operations. The signal SYNC is read in with the data bus A. The content of the data bus A simultaneously read is defined as shown in Table 23.

TABLE 23

| (Function of Signal SYNC) | | |
|---|---|---|
| $SYNC_1$ | $SYNC_0$ | Meaning |
| 1 | 1 | The first pixel of REAL STICK |
| 1 | 0 | The first pixel of PSEUDO STICK |
| 0 | 1 | The last pixel (not the first) of REAL or PSEUDO STICK |
| 0 | 0 | The other pixels except the first and last of REAL or PSEUDO STICK |

(Note 1) Pixel data which forms a stick is actually read in.

(Note 2) In the MM mode, when the pixel data in the SRU is reused, the pixel data which forms the stick is not read in, but operation is done as if sticks of the same stick length are sequentially inputted. It is called a pseudo stick. In the RSI/SM mode, since the sticks of the stick length of 1 are sequentially inputted, the $SYNC_{0-1}$ always supplies $(11)_2$. Alternatively, by setting the control signal SYNC-ENABLE in the CU to "0" ("Low" level), the RSI/SM mode is attained. In the RSI/MM mode, the SSI/SM mode and the SSI/MM mode, the signal SYNC-ENABLE must be "1" ("High" level). The timing of the signal SYNC in the respective modes is shown in FIG. 33, in which FIG. 33a is for the RSI/MM mode, FIG. 33b is for the SSI/SM mode and FIG. 33c is for the SSI/MM mode. A symbol ◯ indicates the image data.

The following controls are attained by the signal SYNC.

(1) DU: Multiplexer SEL-A in the RB
(2) LU: Multiplexer SEL-A and SEL-B
(3) EU:
  ① Update timing for the MAXR and the MINR
  ② Counting of the CNT
  ③ Update timing for the CLR
  ④ Alternation of the MAXR/CLR or the MINR/CLR in the LO, where the MAXR and the CLR, and the MINR and the CLR are outputted to the LO in time division fashion during the execution of the operation.

Direct Data Supply

By setting the control signal PU-SEL-C of the control unit (CU) to "1" ("High" level), the 32-bit data can be supplied from the ports P1–P3 to the processor unit (PU) without using the DU. The supply system is as follows.

| Port 3 (high order 8 bits) | → PE0 |
|---|---|
| Port 3 (low order 8 bits) | → PE1 |
| Port 1 (8 bits) | → PE2 |
| Port 2 (8 bits) | → PE3 |

Since the data bus B is used as the input terminal, a "High" level voltage must be applied to the bus direction (BD) terminal. The skew registers (VSR-A, VSR-B) of the port 1 and the port 2 are not used. Since only one-stage input register is provided, the input/output timing is such that A-to-LO, B-to-LO, LI-to-LO and A-to-BNR, B-to-BNR, LI-to-BNR are equal to A-to-LO and A-to-BNR, respectively, in the RSI/SM mode with a=1 which is the number of shift stage of the variable stage shift register 711 in the port 1.

<Configuration of Image Processing System>

An image processing system having a plurality of image signal processor described above is now explained. FIG. 4 shows a system having four LSI's. The system is operated in the raster scan input mode (RSI).

An input image 1000 is a gray image consisting of 8 bits per pixel. Like a scan system of a television image, the input image 1000 is scanned from a left-top corner to a right-bottom corner (with a main scan direction being left to right and a sub-scan direction being top to bottom) eight bits per pixel and a line of pixel data is sequentially taken out from the memory or the television camera onto the signal lines 2001–2008. The line of pixel data is then supplied to the LSI 1100 and the 8-bit delay circuit 1002, which delays the line of pixel data by the number of pixels corresponding to one line of input image. The delay line 1002 outputs the line of pixel data onto the signal lines 2011–2018 and the line of pixel data is supplied to the second LSI 1200 and the delay circuit 1003, which outputs the line of pixel data to the LSI 1300 and the delay circuit 1004, which in turn outputs the line of pixel data to the LSI 1400. Like the delay circuit 1002, the delay circuits 1003 and 1004 delay the line of pixel data by a time period required to scan only one line of input image 1000. Thus, four lines of pixel data which are vertically sequential in the input image 1000 are read out on the signal lines 2001–2008, 2011–1018, 2021–2028 and 2031–2038 at any time except the beginning and the end of the scan. Those four lines of pixel data are applied to the terminals A0–A7 (terminals 1–7 in FIG. 11) of the respective LSI's.

The terminals LO0–LO15 (terminals 33–39 and 41–48 in FIG. 11) of the LSI 1100 are connected to the terminal LI0 ∝ LI15 (terminals 17–32 in FIG. 11) of the LSI 1200. The terminals LO0–LO15 of the LSI 1200 are connected to the terminals LO0–LO15 of the LSI 1300. The output of the LSI 1400 is the line of pixel data of the output image 1001.

In the system shown in FIG. 4, the numbers of delay stages of the variable stage shift registers (VSR-A) 711 in the respective LSI input buffers 107 are one for the LSI 1100, three for the LSI 1200, five for the LSI 1300 and seven for the LSI 1400 so that the pipeline processing is attained in the system which uses a plurality of identical LSI's.

By setting the numbers of delay stages of the variable stage shift registers (VSR-R) 131, 141, 151 and 161 of the respective LSI data units 101 to one, image processing using 4×4 neighbourhood pixels can be attained. When the operation cycle is set to 6 MHz, a non-interlaced television image consisting of 256×256 pixels can be real-time processed.

<Advantage of the Invention>

As described hereinabove, according to the present invention, the image processing is carried out at a high speed, and general-purpose and flexible image processing and an architecture suitable for LSI implementation is attained.

We claim:

1. An image signal processing LSI comprising:
 a data unit for inputting serial image data, converting the image data into parallel image data, and transferring the parallel image data to a processor unit;
 the processor unit including a plurality of parallelly arranged processor elements each thereof receiving image data from said data unit and modulation data with respect to the image data;
 a control unit for altering operation functions of the processor elements of said processor unit; and
 a linkage unit coupled to the processor unit for receiving the parallelly processed data and carrying out a linkage operation of the parallelly processed data received from the processor unit.

2. An image signal processing LSI according to claim 1, wherein said control unit has a function of stopping an operation any one of said processor elements.

3. An image signal processing LSI comprising:
 a data unit for inputting serial image data, converting the inputted data into parallel image data, and transferring the converted data to a processor unit;
 the processor unit including a plurality of parallelly arranged processor elements each having at least two input ports, the processor unit parallelly processing data received by the processor unit;
 a control unit for respectively controlling the application of image data from said data unit to one of the input ports of said each processor and modulation data with respect to the image data inputted to the other of the input ports of said each processor element; and
 a linkage unit coupled to the processor unit for receiving the parallel data from each of the processor elements of said processor unit, and carrying out a linkage operation of the parallelly processed data received from the processor unit.

4. An image signal processing LSI according to claim 3, further comprising a memory unit for storing said modulation data including at least weight coefficients.

5. An image signal processing LSI according to claim 3, further comprising an input port for inputting said modulation data, said input port also inputting at least processed image data from another processing LSI.

6. An image signal processing LSI comprising:
 first, second and third input ports for inputting data to be processed in said LSI;
 a data unit coupled to the first and second ports for converting the data inputted from said first and second input ports into parallel data;
 a processor unit coupled to the data unit for parallelly processing said input data and said converted data on the basis of operation data from an internal memory and providing an output of the results of the parallel processing of the input data;
 a linkage unit coupled to the processor unit and the third port for linking the data inputted from said third input port and said parallelly processed data of the processor unit to produce an output; and
 a control unit for controlling at least an input/output operation of said second input port to use said second input port also as an output port.

7. An image signal processing LSI according to claim 6, wherein said processor unit has plural processor elements, said control unit causes the storage of an operand supplied from said third input port in a memory in accordance with a control signal supplied from outside of the LSI and supplies the operand from said memory directly to said processor elements to carry out parallel operations.

8. An image signal processing LSI according to claim 7, wherein data is supplied to said processor elements one byte at a time when said LSI carries out a primary differentiation operation, and two bytes at a time, including one byte for designating an image processing area when said LSI processes a binary image.

9. An image signal processing LSI according to claim 6, wherein said second input port includes a tri-state buffer which functions as an output port in response to a bus direction signal from said control unit.

10. An image signal processing LSI according to claim 6, further comprising:
   a first path for supplying the data inputted from said first input port and said second input port to said processor unit through respective delay circuits;
   a second path for supplying the data inputted from said second input port directly to said processor unit and supplying the data inputted from said first input port to said processor unit through the delay circuits;
   a third path for supplying the data inputted from said third input port, said first input port and said second input port directly to said processor unit;
   the control unit producing a control signal; and the data being inputted through said paths in accordance with the control signal from said control unit.

11. An image signal processing LSI according to claim 1, wherein portions of said delay circuits are variable stage shift registers.

12. An image signal processing LSI according to claim 6, wherein said linkage unit and said processor unit form pipeline stages of a register driven in synchronism with an operation execution signal outputted in an operation execution mode and/or a set-up signal outputted in a set-up mode, of the control signal from said control unit.

13. An image signal processing LSI according to claim 6, wherein said first input port, said second input port, said third input port, said data unit, said processor unit and said linkage unit are programmably configured by storing the external control signal of said control unit in said set-up mode.

14. An image signal processing LSI according to claim 13, wherein said external control signal from said third port is stored in a control register in said control unit in said set-up mode, and the external control signal includes parts specifying the function of each unit in the LSI, and the remaining parts of each unit being determined by another external signal.

15. An image signal processing LSI comprising:
   a first port for inputting image data;
   a data unit for shifting said image data in plural stages and parallelly transferring the image data at each stage to a processor unit;
   a second port for successively outputting externally the image data at the final shift stage;
   the processor unit including a plurality of processor elements which carry out parallel processing of the parallel data transferred from said data unit and providing an output of the results of the parallel processing;
   a third port for inputting basic data for image processing, control data for designating an operational function and processed image data from another image signal processing LSI;
   a control unit responsive to the control data from said third port for outputting a command signal necessary for operation control;
   a memory unit for storing said basic data inputted from said third port and outputting the stored data to said processor unit on the basis of the command signal from said control unit;
   a linkage unit coupled to the processor unit for receiving operation results from said processor unit and the processed image data from said another processing LSI and for carrying out a linkage operation of the results of the parallel processing; and
   a fourth port for externally outputting operation results of said linkage unit.

* * * * *